US009069382B1

(12) United States Patent
Starner et al.

(10) Patent No.: US 9,069,382 B1
(45) Date of Patent: Jun. 30, 2015

(54) USING VISUAL LAYERS TO AID IN INITIATING A VISUAL SEARCH

(75) Inventors: Thad Eugene Starner, Mountain View, CA (US); Irfan Essa, Atlanta, GA (US)

(73) Assignee: Google Inc., Mountain View, CA (US)

( * ) Notice: Subject to any disclaimer, the term of this patent is extended or adjusted under 35 U.S.C. 154(b) by 430 days.

(21) Appl. No.: 13/417,578

(22) Filed: Mar. 12, 2012

Related U.S. Application Data

(60) Provisional application No. 61/584,082, filed on Jan. 6, 2012.

(51) Int. Cl.
*G06F 3/01* (2006.01)
*G06F 3/038* (2013.01)

(52) U.S. Cl.
CPC ................ *G06F 3/011* (2013.01); *G06F 3/017* (2013.01); *G06F 3/038* (2013.01)

(58) Field of Classification Search
None
See application file for complete search history.

(56) References Cited

U.S. PATENT DOCUMENTS

| 7,064,742 | B2 | 6/2006 | Navab et al. |
| 7,301,648 | B2 | 11/2007 | Foxlin |
| 2008/0266323 | A1 | 10/2008 | Biocca et al. |
| 2010/0315329 | A1 | 12/2010 | Previc et al. |
| 2011/0098056 | A1* | 4/2011 | Rhoads et al. ............. 455/456.1 |
| 2013/0194259 | A1* | 8/2013 | Bennett et al. ................ 345/420 |
| 2014/0063055 | A1* | 3/2014 | Osterhout et al. ............ 345/633 |

OTHER PUBLICATIONS

Oikonomidis et al., "Efficient Model-based 3D Tracking of Hand Articulations using Kinect," The 22nd British Machine Vision Conference (Aug. 2011).
Wang et al., "Real-Time Hand-Tracking with a Color Glove," ACM Transactions on Graphics (Jul. 2009).
Lyons et al., "GART: The Gesture and Activity Recognition Toolkit," HCI (Jul. 2007).
de la Hamette et al., "Laser Triangulation as a means of robust Visual Input for Wearable Computers," International Symposium on Wearable Computers (Oct. 2004).
Athitsos et al., "Estimating 3D Hand Pose from a Cluttered Image," Proceedings of the IEEE Computer Society Conference on Computer Vision and Pattern Recognition (Jun. 2003).
Stenger et al., "Model-Based 3D Tracking of an Articulated Hand," Proceedings of the IEEE Computer Society Conference on Computer Vision and Pattern Recognition (Dec. 2001).
Freeman et al., "Orientation Histograms for Hand Gesture Recognition," Mitsubishi Electric Research Laboratories (Dec. 1994).
"Histogram of Oriented Gradients," Wikipedia, (Feb. 15, 2012), http://en.wikipedia.org/wiki/Histogram_of_oriented_gradients.

* cited by examiner

*Primary Examiner* — Joseph Haley
*Assistant Examiner* — Emily Frank
(74) *Attorney, Agent, or Firm* — McDonnell Boehnen Hulbert & Berghoff LLP

(57) ABSTRACT

Methods and devices for initiating a search are disclosed. In one embodiment, a method is disclosed that includes receiving video data captured by an image-capture device on a wearable computing device, segmenting the video data into a number of layers and, based on the video data, detecting that a pointing object is in proximity to a first layer. The method further includes initiating a first search on the first layer. In another embodiment, a wearable computing device is disclosed that includes an interface configured to receive video data captured by an image-capture device, a processor, and data storage comprising instructions executable by the processor to segment the video data into a number of layers and, based on the video data, detect that a pointing object is in proximity to a first layer. The instructions are further executable by the processor to initiate a first search on the first layer.

23 Claims, 17 Drawing Sheets

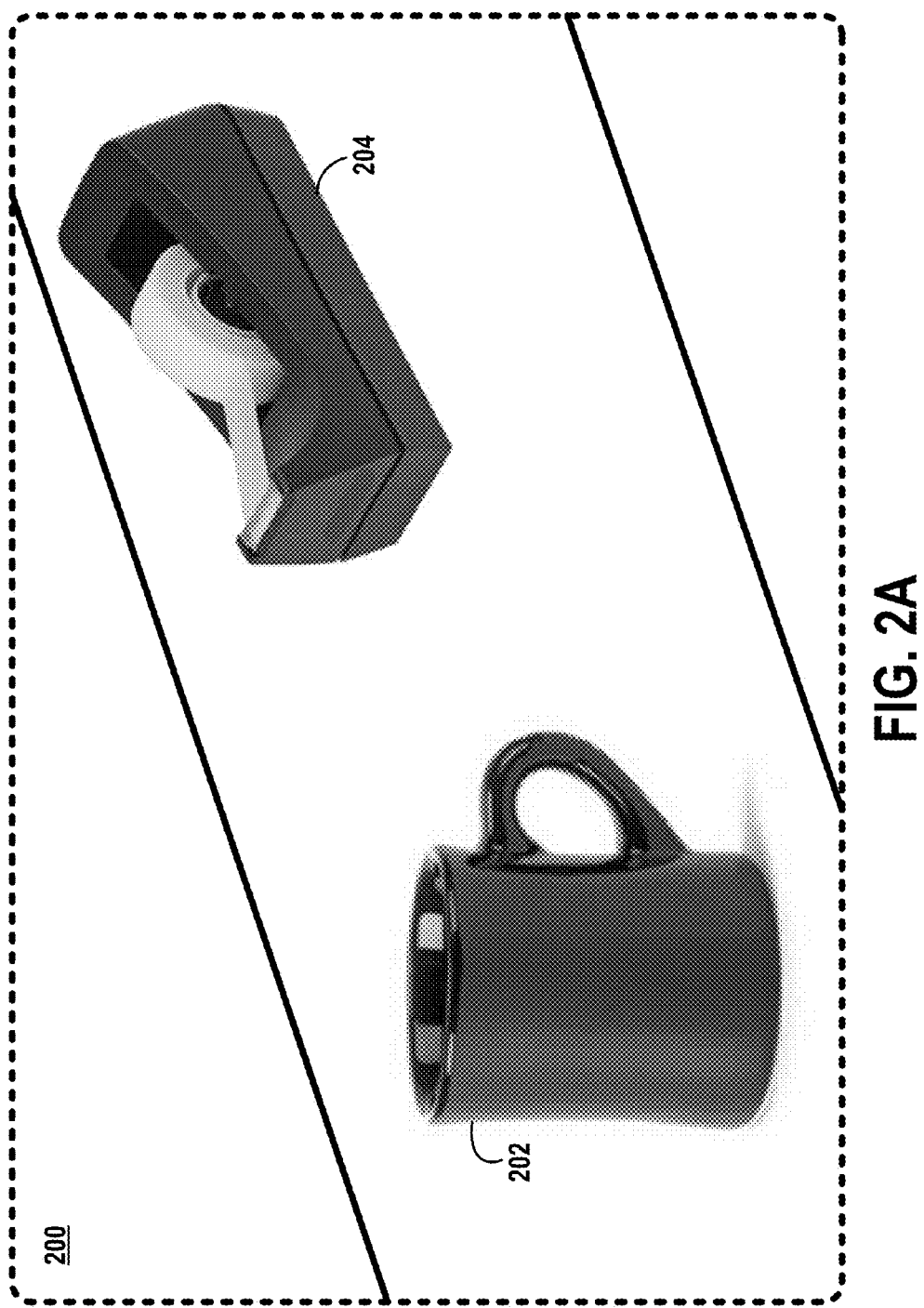

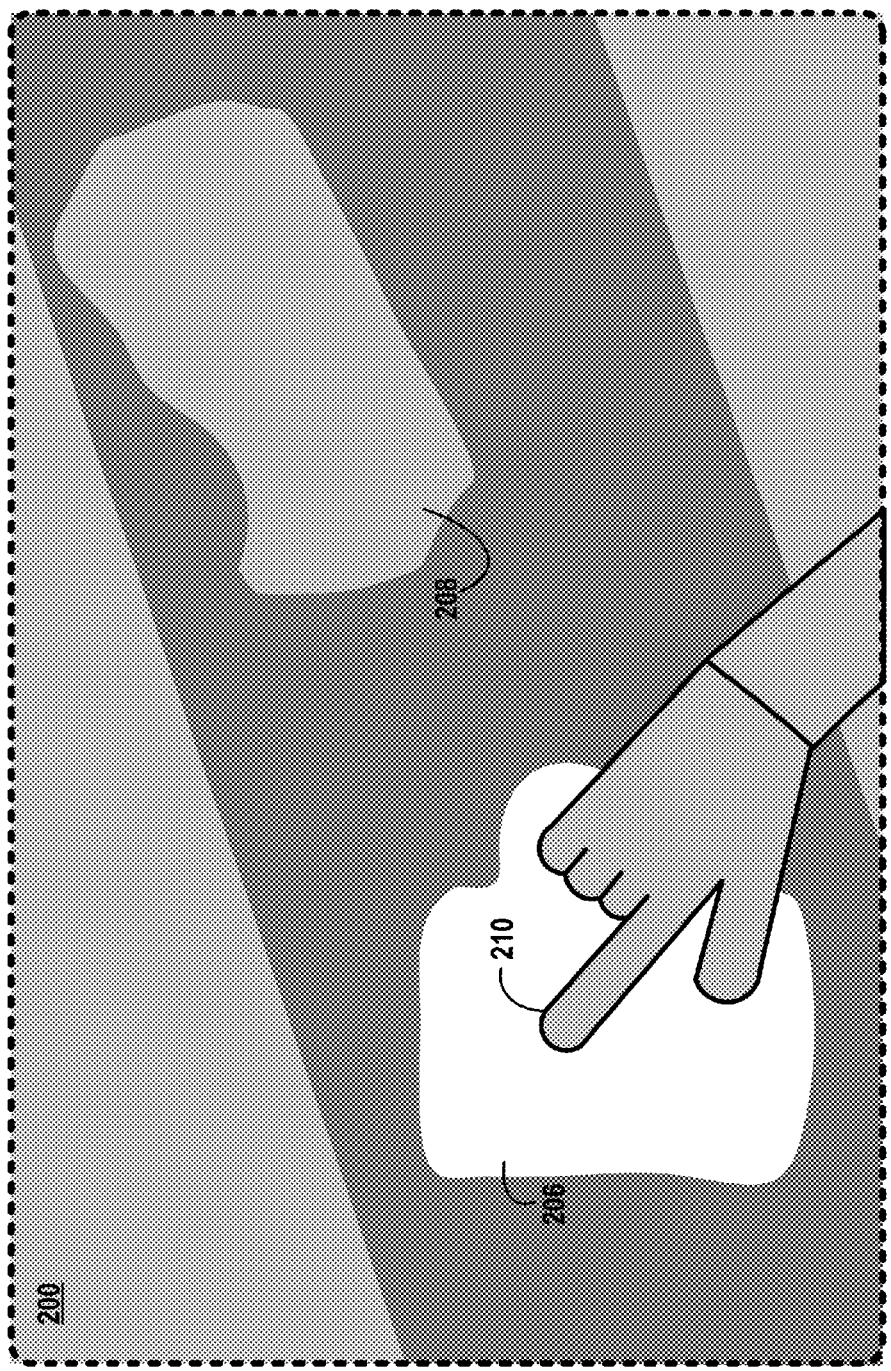

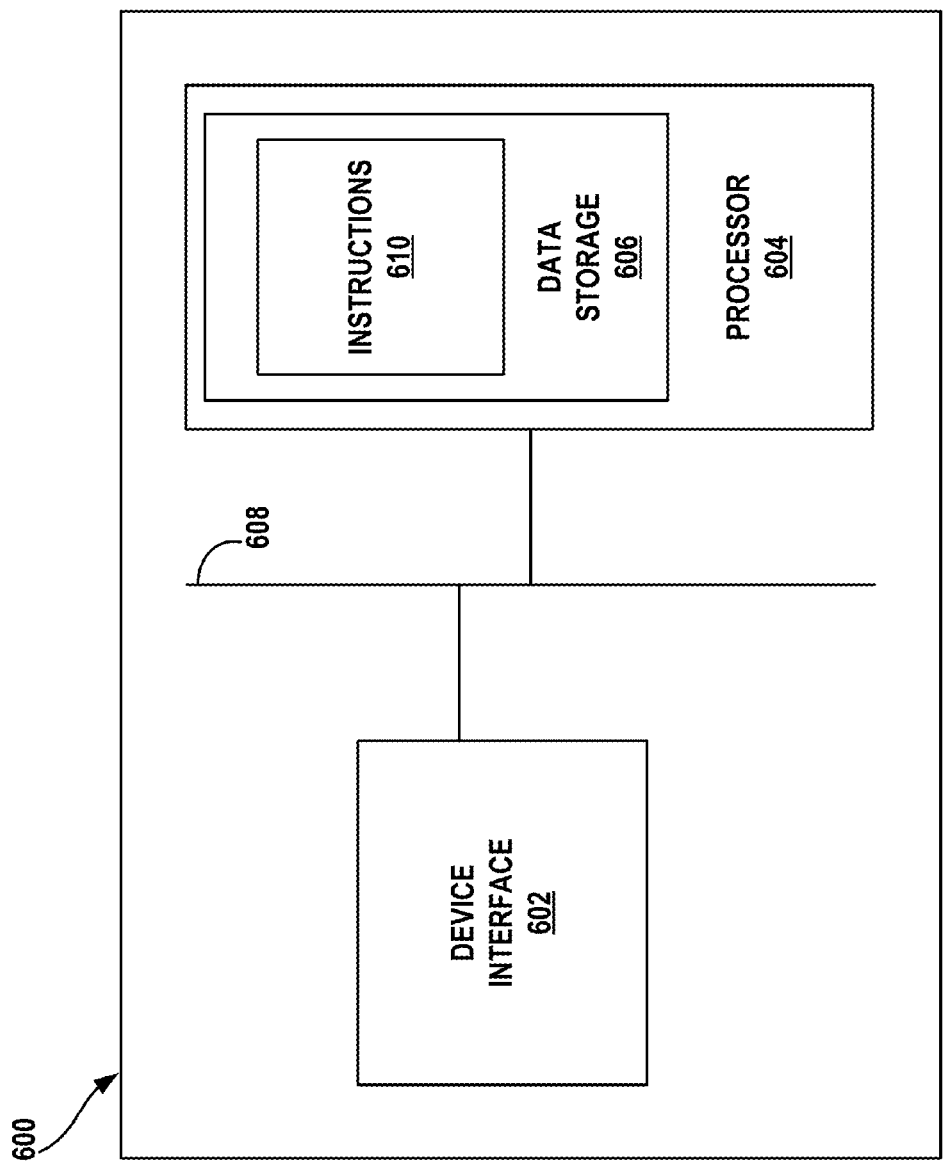

USING VISUAL LAYERS TO AID IN INITIATING A VISUAL SEARCH

CROSS-REFERENCE TO RELATED APPLICATION

This application is a non-provisional of U.S. Provisional Patent Application Ser. No. 61/584,082 filed Jan. 6, 2012, the contents of which are hereby incorporated by reference.

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a user as they go about various aspects of their everyday life. Such computing devices, which are commonly referred to as "wearable" computing devices, are configured to sense and analyze a user's environment and to provide information intelligently, as appropriate to the physical world being experienced by the user.

SUMMARY

In one aspect, an example method is disclosed that includes receiving video data captured by an image-capture device on a wearable computing device, segmenting the video data into a number of layers, and, based on the video data, detecting that a pointing object is in proximity to a first layer. The method further includes initiating a search on the first layer.

In yet another aspect, a non-transitory computer-readable medium is disclosed having stored therein instructions executable by a computing device to cause the computing device to perform the example method described above.

In still another aspect, a wearable computing device is disclosed that includes an interface configured to receive video data captured by an image-capture device, at least one processor, and data storage comprising instructions executable by the at least one processor to segment the video data into a number of layers and, based on the video data, detect that a pointing object is in proximity to a first layer. The instructions are further executable by the processor to initiate a first search on the first layer.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2A is an image of a scene as it may be perceived by a user of an example wearable computing device while using an image-capture device on the wearable computing device to record video data, in accordance with an embodiment.

FIG. 2C is an image of a scene as it may be perceived by a user of an example wearable computing device while detecting that a pointing object is in proximity to a first layer, in accordance with an embodiment.

FIG. 6 is a simplified block diagram of an example server, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview

A wearable computing device may be configured to record video data of, for example, an environment surrounding a user. While the wearable computing device is recording the video data, the user may wish to recognize and/or search for information pertaining to a particular object in the environment. In order to aid the user in selecting the object, the wearable computing device (or, in some embodiments, a server in communication with the wearable computing device) may segment the video data into layers and the wearable computing device may display an indication of the layers.

While the wearable computing device displays indications of the layers, the user may move a pointing object in proximity to a first layer. Based on the video data, the wearable computing device may detect that the pointing object is in proximity to the first layer and may initiate a search on the first layer.

The above method may be particularly useful in an environment that includes a number of objects. The user may specify which of the objects the user wishes to search on, and may indicate the object by moving the pointing object in proximity to the layer that includes the object. In this manner, the user may more quickly receive the search results that the user desires, and computing power may not be expended to perform searches in which the user is not interested. In addition, the search results may be more accurate as a result of the user indicating the layer in which the objects to be searched are located.

2. Example Method

Figure 1:
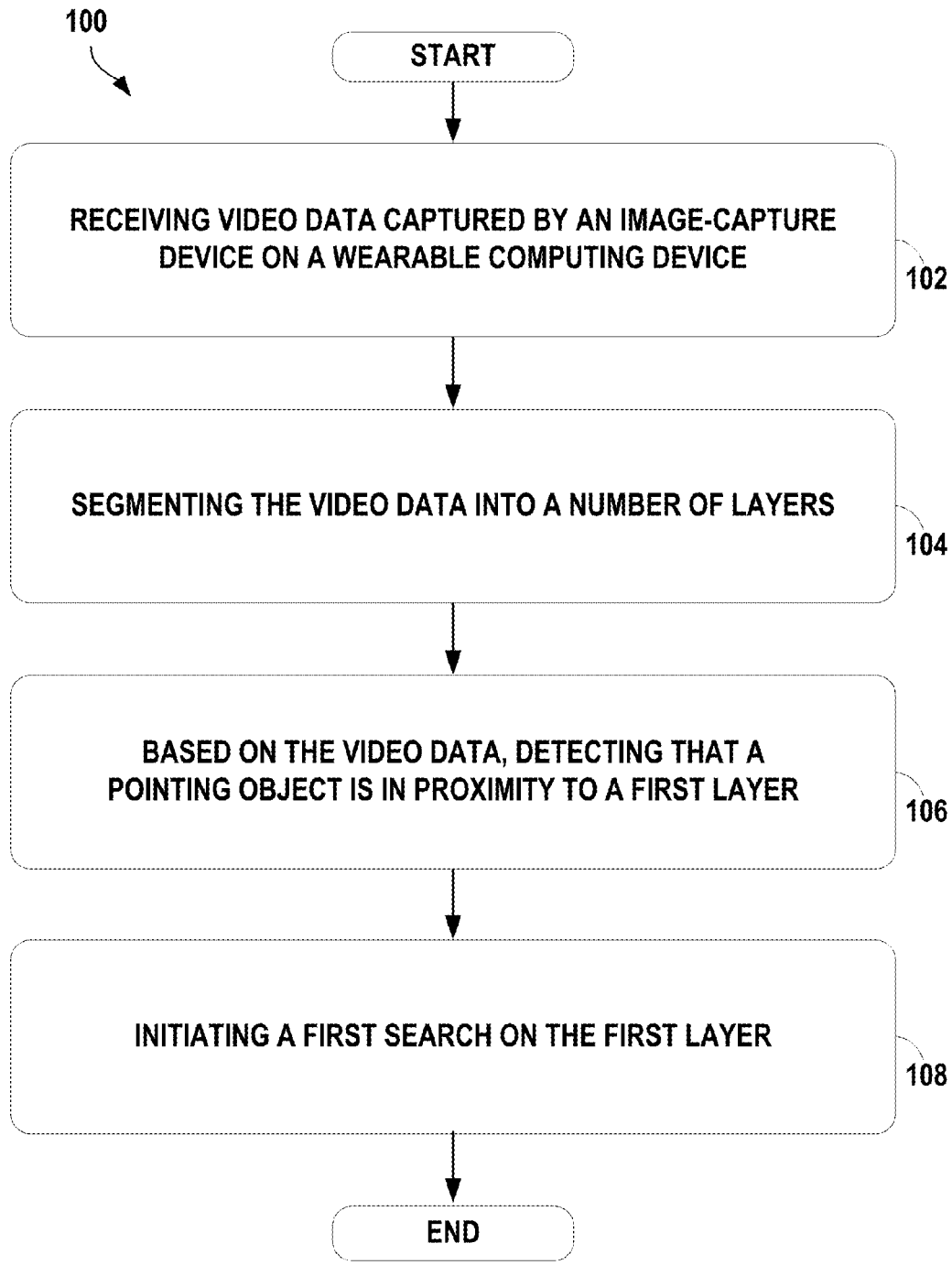
FIG. 1 is a flow chart illustrating an example method, in accordance with an embodiment.

FIG. 1 is a flow chart illustrating an example method 100, in accordance with an embodiment. Method 100 shown in FIG. 1 presents an embodiment of a method that, for example, could be used with systems, wearable computing devices, and servers described herein. Method 100 may include one or more operations, functions, or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is wired to perform the specific logical functions in the process.

Blocks 102-108 may be executed by a wearable computing device, a server, or some combination thereof. For purposes of illustration, the method 100 is described below for a wearable computing device. It is to be understood, however, that one or more of blocks 102-108 may alternatively or additionally be executed by a server. That is, in some embodiments, all of blocks 102-108 may be performed at the wearable computing device, all of blocks 102-108 may be performed at the server, or one or more of blocks 102-108 may be performed at the wearable computing device and the remaining block(s) may be performed at the server.

As shown, the method 100 begins at block 102 where a wearable computing device receives video data captured by an image-capture device on the wearable computing device. The wearable computing device may store the raw video data recorded at the image-capture device and/or may process the raw video data recorded at the image-capture device and may store the processed video data. Any processing of the raw video data may be performed at the wearable computing device, at the server, and/or at a peripheral device or other entity that is communicatively coupled to the wearable computing device. The method 100 continues at block 104 where the wearable computing device segments the video data into a number of layers. The wearable computing device may segment the video data by, for example, segmenting the video data into layers that have common motion, depth, surface orientation, color, and/or brightness. Alternatively or additionally, the wearable computing device may segment the video data into layers by detecting edges of objects in the video data. The wearable computing device may detect edges of the objects by, for example, scanning the video data for discontinuities, such as discontinuities in motion, depth, surface orientation, color, and/or brightness, and may detect the edges to be along the discontinuities. The edge detection may be further refined using one or more techniques including, for example, search-based edge detection, zero-crossing-based edge detection, and Canny edge detection. Other segmenting techniques are possible as well. Depending on the techniques used by the wearable computing device to segment the video data, the layers may exhibit one or more kinds of coherence, such as motion coherence and/or appearance coherence, for example. Other types of coherence are possible as well.

The method 100 continues at block 106 where, based on the video data, the wearable computing device detects that a pointing object is in proximity to a first layer. The pointing object may be, for example, a body part of a user (e.g., a finger) or a pointing object controlled by a user (e.g., a glove). Other pointing objects are possible as well.

In order to detect that the pointing object is in proximity to the first layer, the wearable computing device may detect the pointing object. To this end, the wearable computing device may, for example, monitor the video data for the appearance of the pointing object. To this end, the pointing object may have a known and/or recognizable shape, texture, color, depth, and/or pattern. For example, in embodiments where the pointing object is a finger of the user, the wearable computing device may monitor the video data for the appearance of an object or item having a color or tone that matches or resembles one or more predetermined colors and/or tones considered to be representative of a variety of skin colors. As another example, in embodiments where the pointing object is a glove, the wearable computing device monitor the video data for the appearance of an object or item having a color, pattern, depth, or shape that matches or resembles a known color or pattern of the stylus. As yet another example, the wearable computing device may use background subtraction techniques to detect the pointing object. To this end, the wearable computing device may compare each frame of the video data with an "average" frame in an effort to detect changes between each frame and the average frame. The average frame may be, for example, the first frame in the video data, the frame immediately before each frame, or an average (e.g., a running average, a running Gaussian average, etc.) of two or more frames before each frame. A two-dimensional convolution may be used to align the frames before averaging in order to compensate for any small head movements of the user. Other average frames are possible as well. In order to detect changes between each frame and the average frame, the wearable computing device may "subtract" each frame from the average frame, such that common pixels cancel and only differing pixels remain, indicating changes between each frame and the average frame. The changes may, for example, indicate movement of the pointing object. As still another example, the wearable computing device may monitor the video data to detect the pointing device by, for example, monitoring an optical-flow differential of the video data as described in, for example, co-pending U.S. patent application Ser. No. 13/105,828 to Starner. For instance, when the pointing device is moving towards the first layer, an apparent movement of the pointing device will by significantly higher than the apparent movement of some or all of the rest of the video data, as the pointing device may be the only moving object in the video data. As a result, the optical-flow vectors of the pointing device will, on average, have a greater magnitude than optical-flow vectors in the rest of the video data, thus creating an optical-flow differential between the pointing device and the remaining video data.

Thus, by detecting the optical-flow differential, the wearable computing device may detect the movement of the pointing device towards the first layer. It will be appreciated that the pointing object may be detected from the video data using other techniques as well, including, for example, those described in the following papers and publications: "Histogram of Oriented Gradients," Wikipedia (2012), http://en.wikipedia.org/wiki/Histogram_of_oriented_gradients; Oikonomidis et al., "Efficient Model-based 3D Tracking of Hand Articulations using Kinect," The $22^{nd}$ British Machine Vision Conference (August 2011); Wang et al., "Real-Time Hand-Tracking with a Color Glove," ACM Transactions on Graphics (July 2009); Lyons et al., "GART: The Gesture and Activity Recognition Toolkit," HCI (July 2007); de la Hamette et al., "Laser Triangulation as a means of robust Visual Input for Wearable Computers," international Symposium on Wearable Computers (October 2004); Athitsos et al., "Estimating 3D Hand Pose from a Cluttered Image," Proceedings of the IEEE Computer Society Conference on Computer Vision and Pattern Recognition (June 2003); Stenger et al., "Model-Based 3D Tracking of an Articulated Hand," Proceedings of the IEEE Computer Society Conference on Computer Vision and Pattern Recognition (December 2001); Freeman et al., "Orientation Histograms for Hand Gesture Recognition," Mitsubishi Electric Research Laboratories (December 1994). It will be appreciated that the pointing device may be detected from the video data using other techniques as well.

Once the wearable computing device has detected the pointing object in the video data, the wearable computing device may detect that the pointing object is in proximity to the first layer. The wearable computing device may detect that the pointing object is in proximity to the first layer by, for example, detecting that the first layer is at least partially occluded by the pointing object, detecting that, of the layers, the first layer is closest to the pointing object, and/or detecting that the first layer includes some or all of the pointing object. The wearable computing device may detect that the pointing object is in proximity to the first layer in other manners as well.

In some embodiments, the wearable computing device may be configured with lenses on which the video data is displayed, such that the user sees representations of the area and the pointing object displayed by the wearable computing device. In these embodiments, the layer that the user sees the pointing object to be in proximity to may be substantially similar to the area that the wearable computing device detects the pointing object to be in proximity to based on the video data. Thus, in these embodiments, the wearable computing device may detect that the pointing object is in proximity to the first layer by simply tracking the pointing object in the video data.

In other embodiments, however, the wearable computing device may be configured with substantially transparent lenses, such that the user sees the layers in the video data but sees the pointing object in the real world. In these embodiments, the image-capture device on the wearable computing device may not be perfectly aligned with an eye of the user, such that the layer that the user sees the pointing object to be in proximity to may be shifted from the layer that the wearable computing device detects the pointing object to be in proximity to based on the video data. In order to correct for this shift, the wearable computing device may determine a distance between the user's eye and the image-capture device and/or an angle between the user's line of sight and an alignment of the image-capture device (e.g., based on calibration data, user input, etc.) and may use the distance and/or the angle to account for the shift. Thus, in these embodiments, the wearable computing device may detect that the pointing object is in proximity to the first layer by tracking the pointing object and using the distance and/or the angle to account for the shift.

At block 108, the wearable computing device initiates a search on the first layer. The search may be, for example, a visual search, such as a search of a two- or three-dimensional image or model database. The database may be stored at the wearable computing device and/or the server, or may be stored remotely and accessible to the wearable computing device and/or the server. Searching the database may involve, for example, comparing the first layer with some or all of the images or models in the database. The wearable computing device may then select an image or model that is most similar to the first layer. Similarity may be determined based on, for example, a number or configuration of visual features (e.g., colors, shapes, textures, depths, brightness levels, etc.) in the first layer and the image or model. For example, an HOG technique may be used to select an image or model, in which each image or model is described by a histogram (e.g., of intensity gradients and/or edge directions), the first layer is described by a histogram, and similarity may be determined based on the histograms. The search may take other forms as well.

In some embodiments, the search may be initiated in response to detecting that the pointing object is in proximity to the first layer. In other embodiments, however, the wearable computing device may make additional determinations before initiating the search. For example, the wearable computing device may additionally determine whether the pointing object was in proximity to the first layer for at least a predetermined amount of time. As another example, the wearable computing device may determine that a request to initiate the search has been received from the user. Other examples are possible as well.

In other embodiments, instead of or in addition to selecting the first layer with the pointing object, a user may provide an aural input to initiate a search. For example, the user may speak a command (e.g., "Search on the cup.") and the wearable computing device may responsively select the layer that most closely resembles the object in the command (e.g., a cup) and may initiate a search on the selected layer. It will be appreciated that a pointing object and spoken commands may be used in combination by a user to initiate a search as well.

Once the search is initiated, the wearable computing device may display information corresponding to results of the search. The information may be, for example, textual and/or graphical information related to the first layer and/or an object in the first layer, such as a top result of the search. Other information is possible as well.

In some embodiments, after the information is displayed, the user may move the pointing object in proximity to a second layer. The wearable computing device may detect that the pointing object is in proximity to the second layer, as described above in connection with the first layer, and may initiate a search on the second layer. The wearable computing device may replace the information corresponding to results of the first search with information corresponding to results of the second search. Such detection and initiation may be executed for additional layers as well.

While the foregoing description focused on detecting the pointing object based on video data captured by an image-capture device on the wearable computing device, in some embodiments, the video data may include first video data of the pointing device, as captured by the image-capture device on the wearable computing device, and second video data of a virtual environment, as generated, for example, at the wearable computing device and/or elsewhere. In these embodiments, the first video data and the second video data may be combined to produce combined video data showing the pointing device of the first video data in the virtual environment of the second video data, and the combined video data may be displayed by the wearable computing device.

With the combined video data displayed by the wearable computing device, a user of the wearable computing device may move the pointing object within the virtual environment and may initiate a search on an object in the virtual environment. The virtual environment may be a computer-generated environment, a real environment, or a combination thereof.

3. Example Embodiment

FIG. 2A is an image of a scene 200 as it may be perceived by a user of an example wearable computing device while using an image-capture device on the wearable computing device to record video data, in accordance with an embodiment. The scene 200 may be a frame from video data recorded by an image-capture device on the wearable computing device and displayed on lenses of the wearable computing device. The video data may be raw video data recorded at the image-capture device, or may be video data that is derived from raw video data recorded at the image-capture device. Alternatively, the scene 200 may be a real-world scene visible to the user through transparent lenses on the wearable computing device. As shown, the scene 200 includes a first object 202 and a second object 204.

Figure 2B:
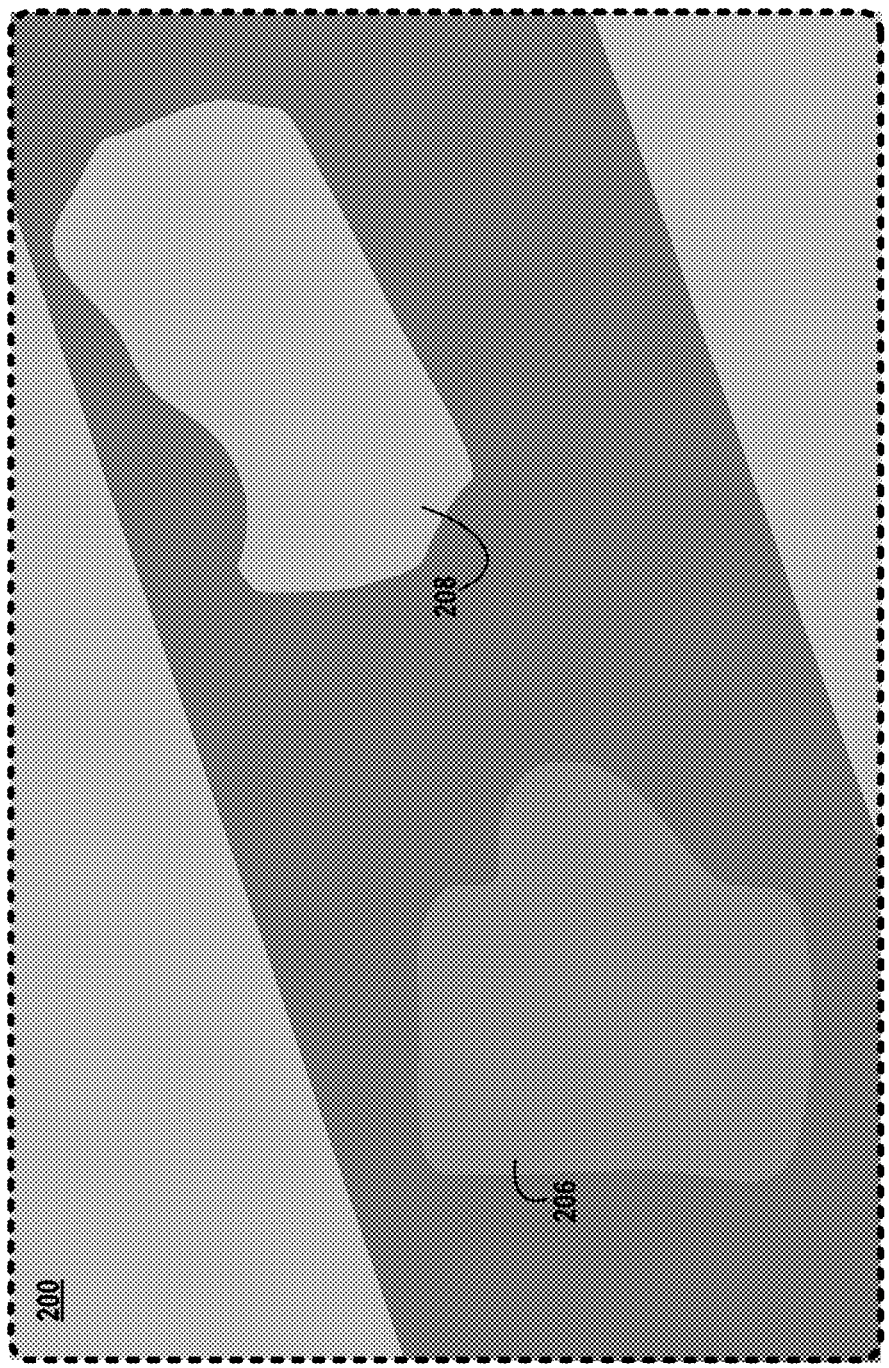
FIG. 2B is an image of a scene as it may be perceived by a user of an example wearable computing device while segmenting video data into a number of layers, in accordance with an embodiment.

FIG. 2B is an image of the scene 200 as it may be perceived by the user of the example wearable computing device while segmenting the video data into a number of layers, in accordance with an embodiment. As described above, the wearable computing device may segment the scene 200 of the video data into layers that exhibit motion coherence and/or appearance coherence. As shown, a first layer 206 includes the first object 202, while a second layer 208 includes the second object 204. Additionally, the background is segmented into three additional layers. While only five layers are shown, it is to be understood that any number of layers is possible and may vary depending on, for example, the content of the scene 200 and the techniques used by the wearable computing device to segment the scene 200.

FIG. 2C is an image of the scene 200 as it may be perceived by the user of the example wearable computing device while detecting that a pointing object 210 is in proximity to the first layer 206, in accordance with an embodiment. As shown, the pointing object 210 is partially overlaying the first layer 206. Thus, the wearable computing device may detect that the pointing object 210 is in proximity to the first layer 206 by, for example, detecting that the first layer 206 is at least partially occluded by the pointing object 210, detecting that, of the layers, the first layer 206 is closest to the pointing object 210, and/or detecting that the first layer 206 includes some or all of the pointing object 210, as described above. The wearable computing device may detect that the pointing object 210 is in proximity to the first layer 206 in other manners as well.

In some embodiments, in response to detecting that the pointing object 210 is in proximity to the first layer 206, the wearable computing device may highlight or otherwise draw the user's attention to the first layer 206, as shown.

Figure 2D:
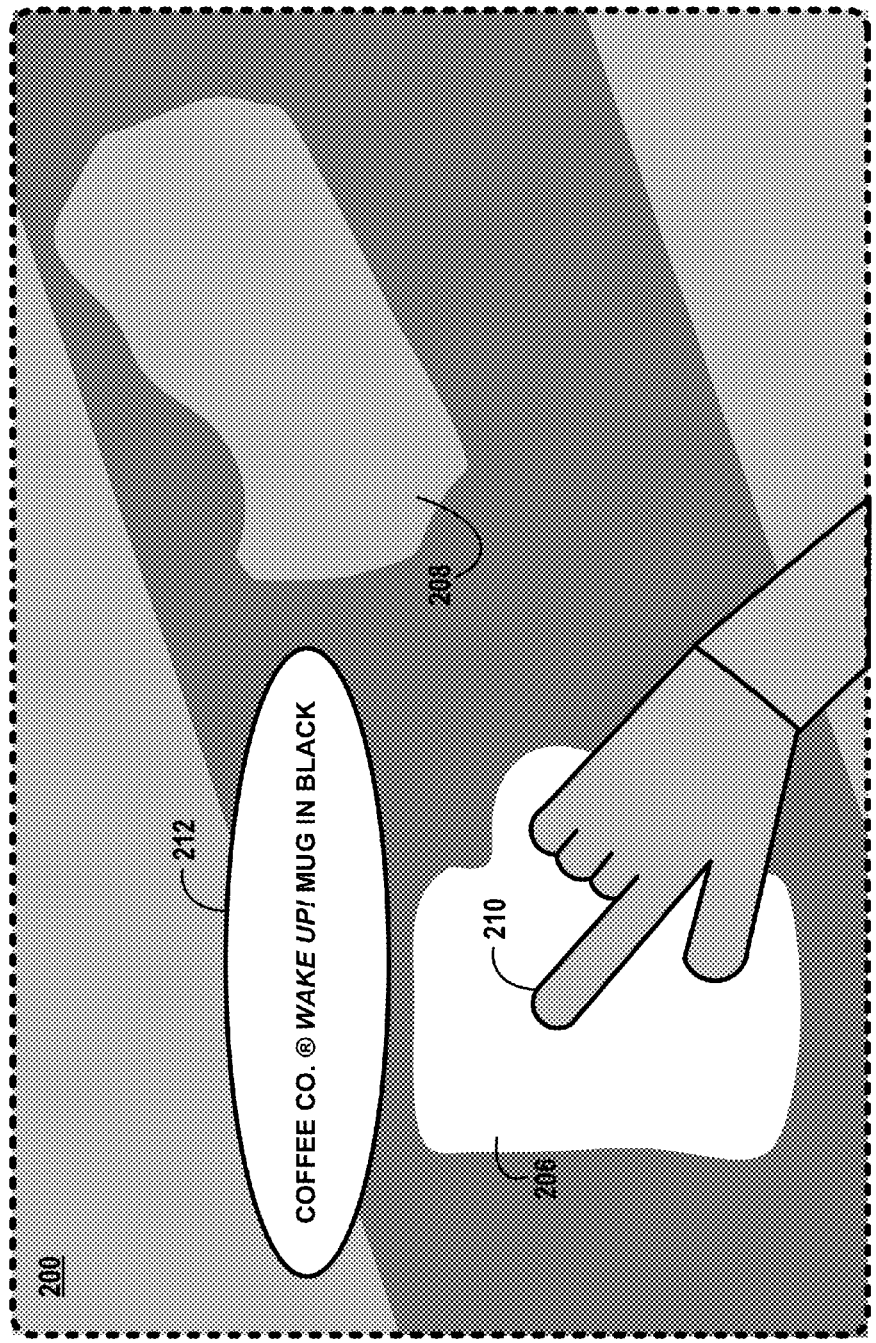
FIG. 2D is an image of a scene as it may be perceived by a user of an example wearable computing device while displaying first information corresponding to results of a first search, in accordance with an embodiment.

As described above, in response to detecting that the pointing object 210 is in proximity to the first layer 206, the wearable computing device may initiate a first search on the first layer 206. FIG. 2D is an image of the scene 200 as it may be perceived by the user of the example wearable computing device while displaying first information 212 corresponding to results of the first search, in accordance with an embodiment. As shown, the first information 212 is overlaid on the scene 200. In other embodiments, the first information 212 may be displayed in other manners as well. For example, the first information 212 may scroll across the scene 200, may replace the scene 200, or may be displayed on a separate display from the scene 200. In still other embodiments, the first information 212 may be presented to the user as audio information. The first information 212 may take other forms as well. Further, while the first information 212 is shown to include certain information, the first information 212 may include any information related to the first layer 206.

Figure 2E:
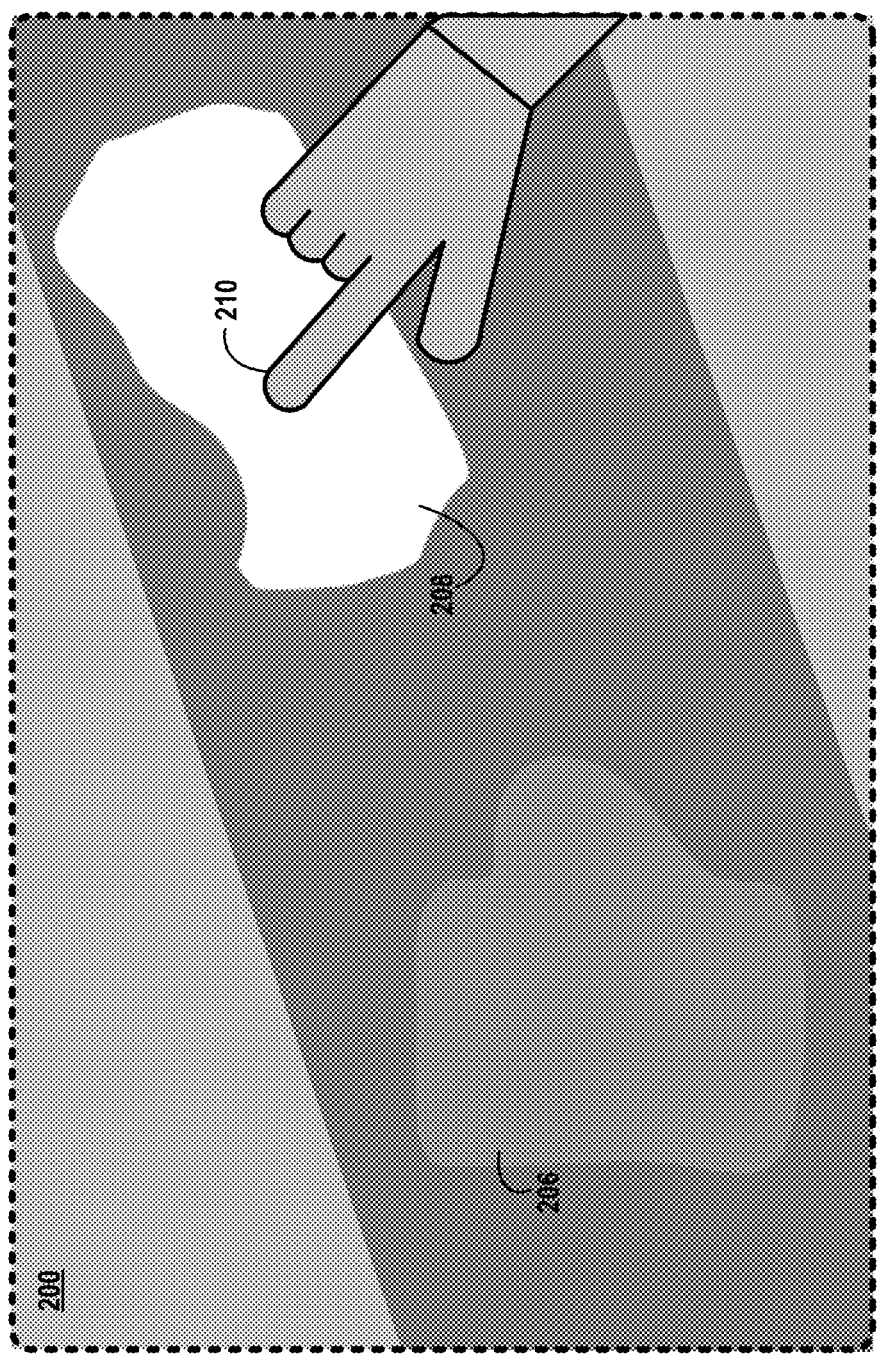
FIG. 2E is an image of a scene as it may be perceived by a user of an example wearable computing device while detecting that a pointing object is in proximity to a second layer, in accordance with an embodiment.

As noted above, in some embodiments, the user may move the pointing object 210 to another layer in the scene 200. FIG. 2E is an image of the scene 200 as it may be perceived by the user of the example wearable computing device while detecting that the pointing object 210 is in proximity to the second layer 208, in accordance with an embodiment. The wearable computing device may detect that the pointing object 210 is in proximity to the second layer 208 in any of the manners described above for the first layer 206.

In some embodiments, in response to detecting that the pointing object 210 is in proximity to the second layer 208, the wearable computing device may highlight or otherwise draw the user's attention to the second layer 208. Additionally, the wearable computing device may unhighlight the first layer 206, as shown.

Figure 2F:
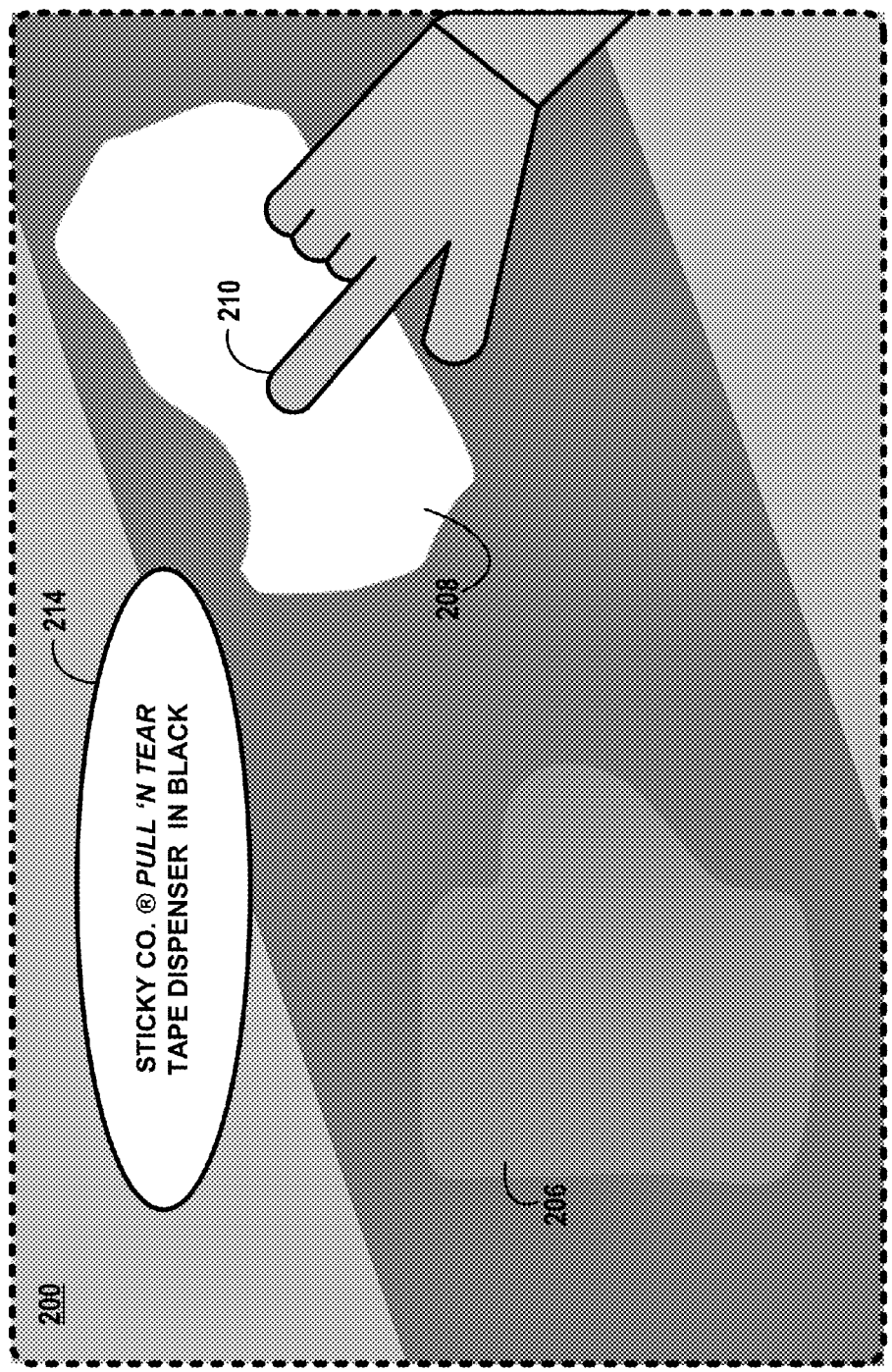
FIG. 2F is an image of a scene as it may be perceived by a user of an example wearable computing device while replacing first information with second information corresponding to results of a second search, in accordance with an embodiment.

Similar to the first layer 206, in response to detecting that the pointing object 210 is in proximity to the second object 208, the wearable computing device may initiate a second search on the second layer 208. FIG. 2F is an image of the scene 200 as it may be perceived by the user of the example wearable computing device while replacing the first information 212 with second information 214 corresponding to results of the second search, in accordance with an embodiment. The second information 212 may take any of the forms described above for the first information 210.

Figure 2G:
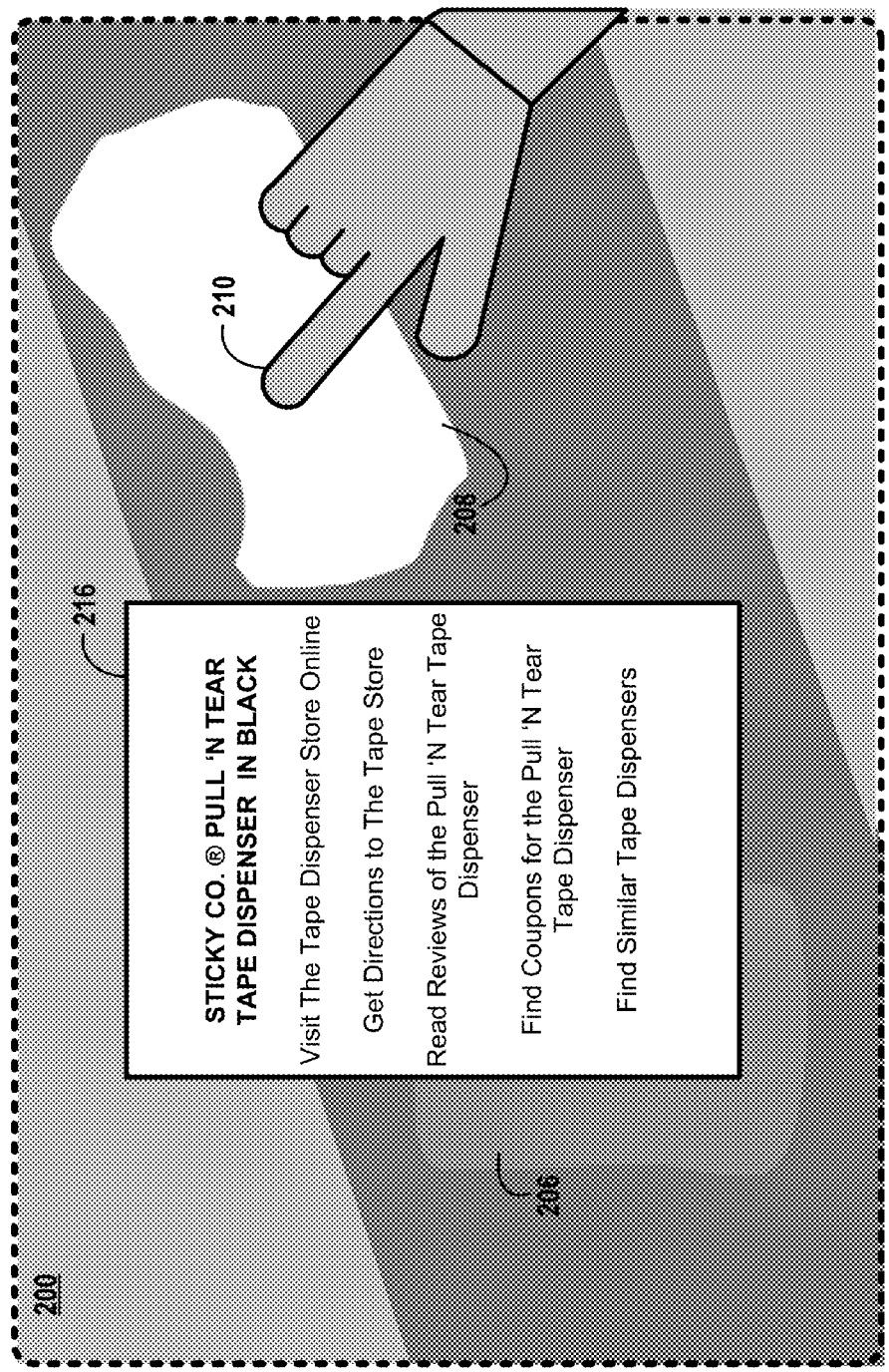
FIG. 2G is an image of a scene as it may be perceived by a user of an example wearable computing device after receiving an acceptance of a second layer from the user, in accordance with an embodiment.

In some embodiments, the first and second information 212, 214 may be only small amounts of information, such as previews of web pages or other sources of information corresponding to results of the first and second searches, respectively. In these embodiments, the user may wish to view additional and/or more complete results of the searches. Accordingly, the user may accept a layer by, for example, providing an acceptance to the wearable computing device while the pointing object 210 is in proximity to the desired layer. The acceptance may be, for example, a tactile, audible, or visual input, and/or may be received through a user interface. FIG. 2G is an image of the scene 200 as it may be perceived by the user of the example wearable computing device after receiving an acceptance of the second layer 208 from the user, in accordance with an embodiment. As shown, in response to receiving the acceptance from the user, the wearable computing device may display additional information 216 corresponding to results of the second search. Alternatively, the wearable computing device may initiate an additional (e.g., more comprehensive) search and the additional information 216 may correspond to results of the additional search.

While the foregoing focused on an embodiment in which a user moved the pointing device in proximity to a first layer 206 and a second layer 208, in other embodiments more or fewer layers are possible as well, and the user may move the pointing device 210 in proximity to layers more than once, if desired by the user.

Figure 2H:
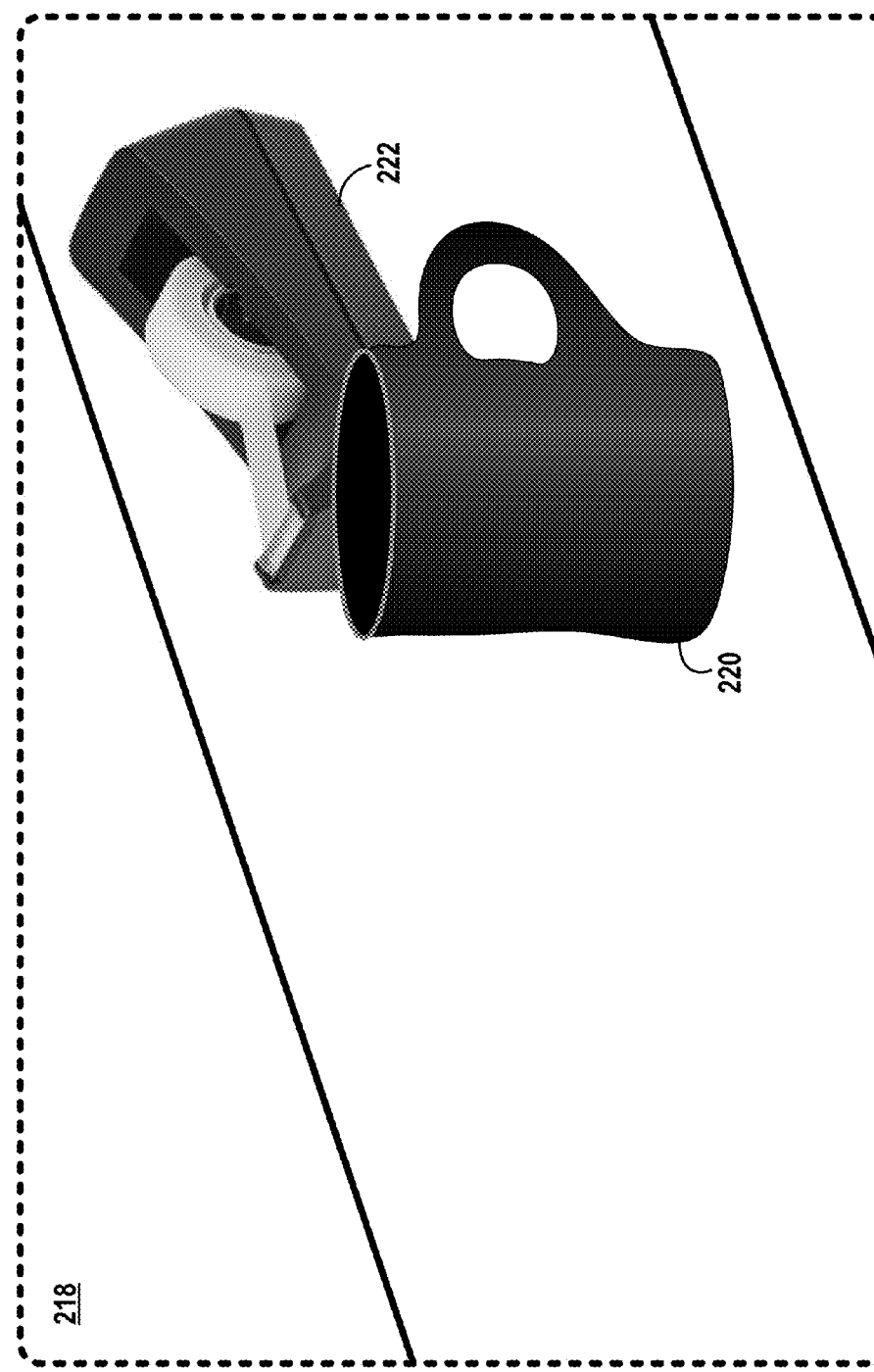
FIG. 2H is an image of a scene as it may be perceived by a user of an example wearable computing device while using an image-capture device on the wearable computing device to record video data, in accordance with an embodiment.

In some embodiments, a user of the wearable computing device may aid the wearable computing device in segmenting the video data into the layers. This approach may be especially useful in situations where, for example, one object partially occludes another object. FIG. 2H is an image of a scene 218 as it may be perceived by a user of an example wearable computing device while using an image-capture device on the wearable computing device to record video data, in accordance with an embodiment. As shown in FIG. 2H, a first object 220 at least partially occludes a second object 222.

Figure 2I:
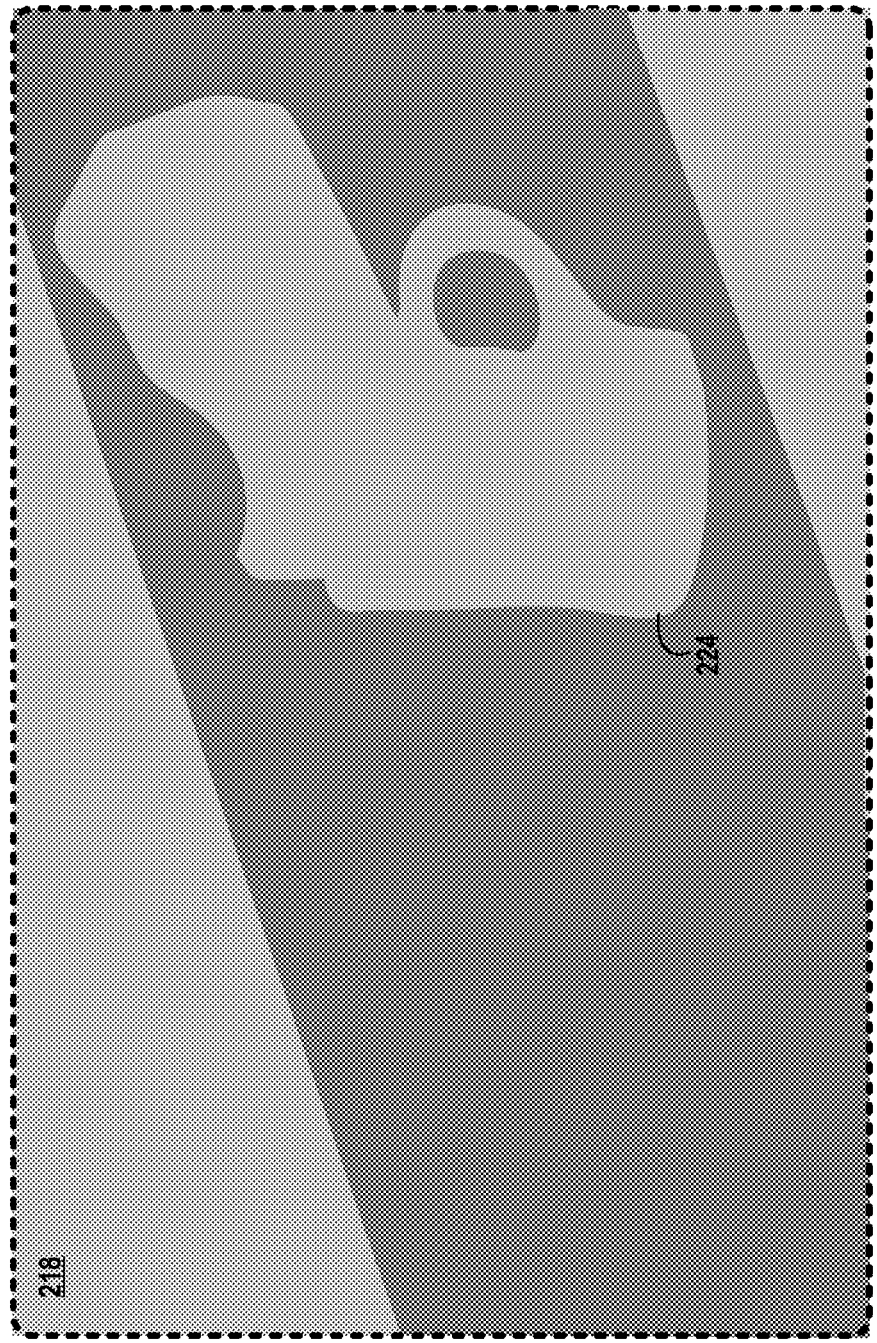
FIG. 2I is an image of a scene as it may be perceived by a user of an example wearable computing device while segmenting video data into a number of layers, in accordance with an embodiment.

When the wearable computing device segments the video data of scene 218 into layers, the wearable computing device may have difficulty distinguishing between the first and second objects 220, 222, such that the first and second objects 220, 222 appear to be a single layer. FIG. 2I is an image of the scene 218 as it may be perceived by the user of the example wearable computing device while segmenting the video data into a number of layers, in accordance with an embodiment. As shown, the wearable computing device has segmented the scene 218, but the first and second objects 220, 222 appear to be a single layer 224.

Figure 2J:
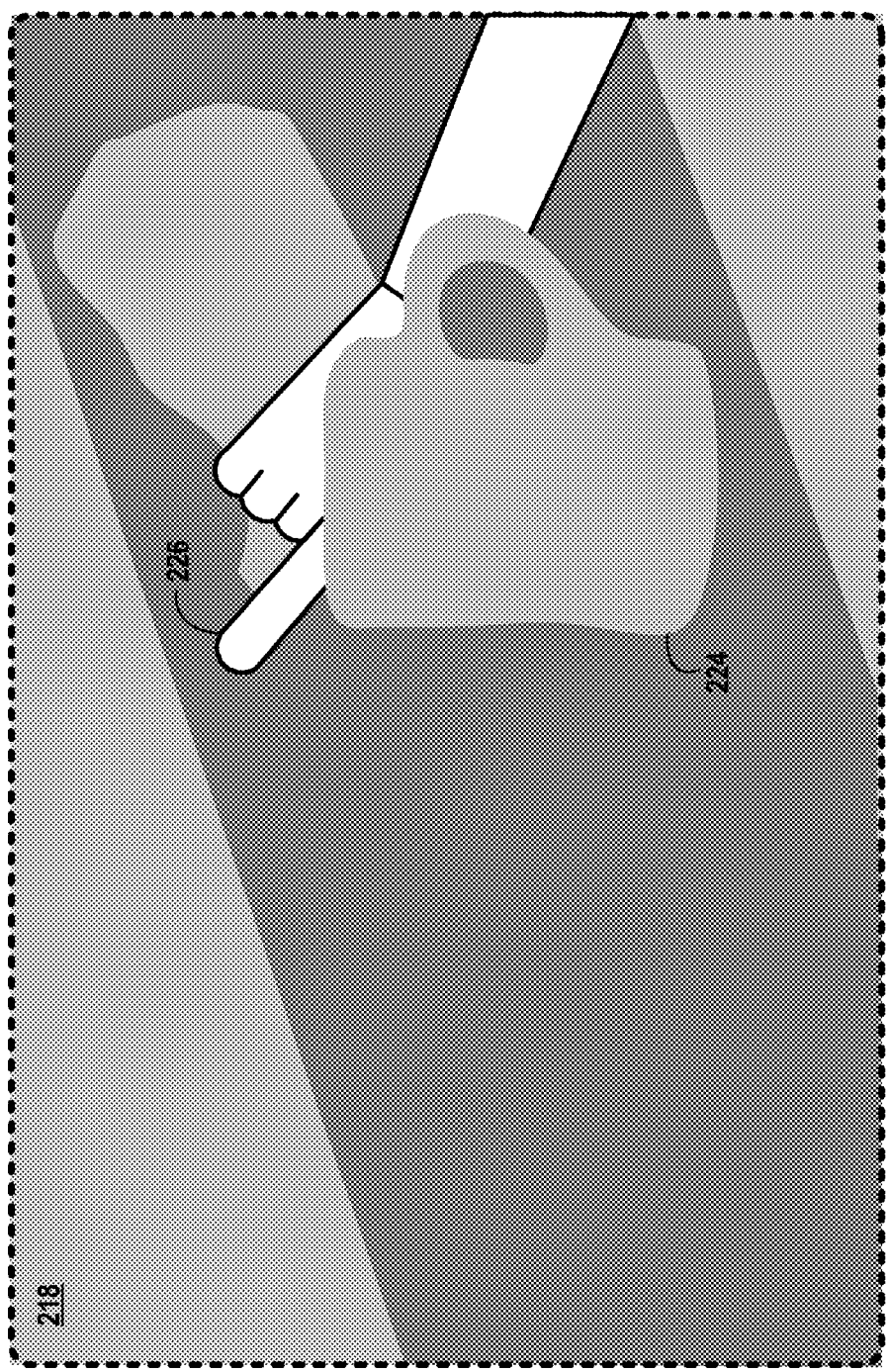
FIG. 2J is an image of a scene as it may be perceived by a user of an example wearable computing device while detecting that a pointing object is passing between a first object and a second object.
Figure 2K:
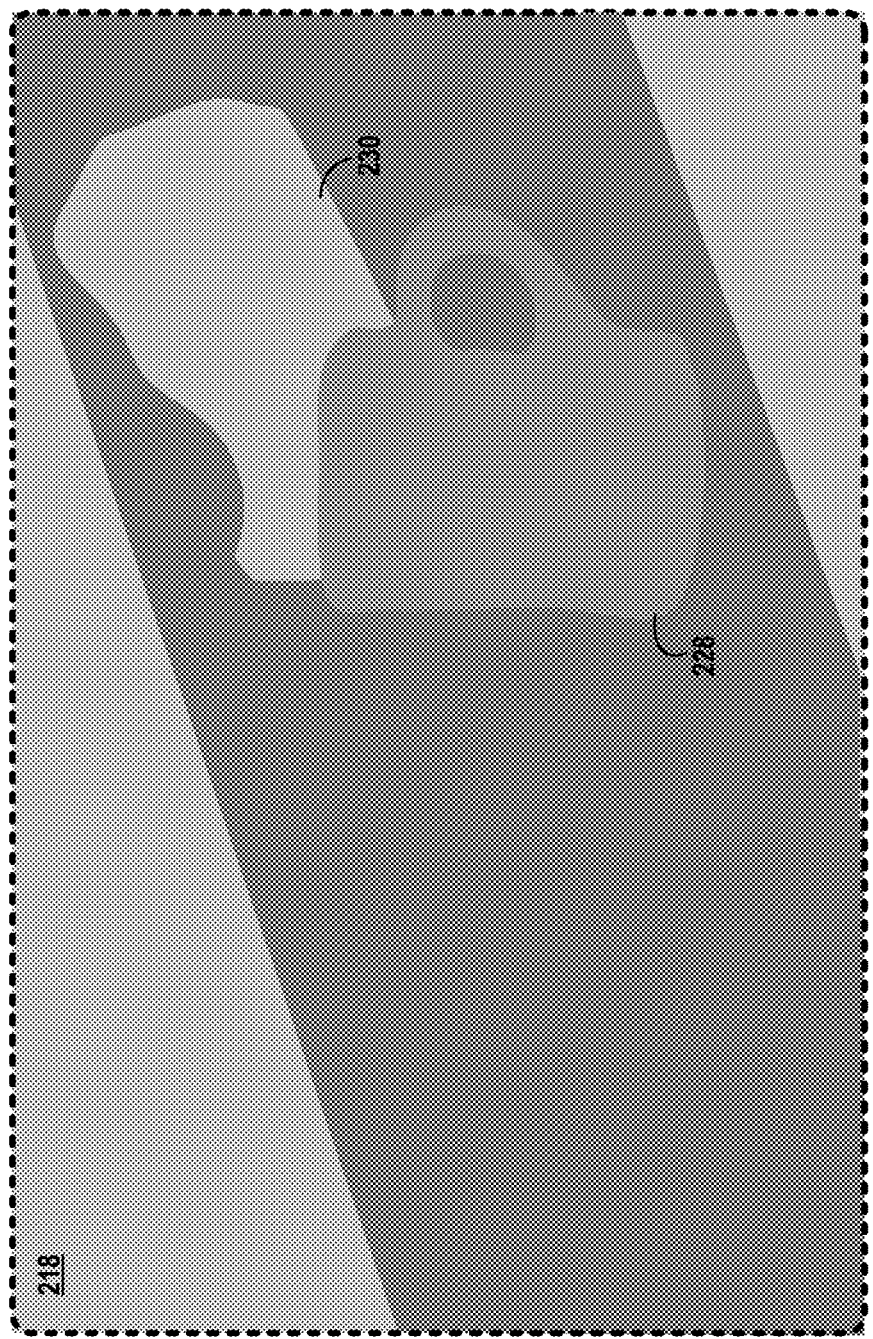
FIG. 2K is an image of a scene as it may be perceived by a user of an example wearable computing device after further segmenting the video data into a number of layers, in accordance with an embodiment.

In order to assist the wearable computing device, a user may pass a pointing object between the first object 220 and the second object 222 to indicate that the first object 220 and the second object 222 are not connected. FIG. 2J is an image of the scene 218 as it may be perceived by the user of the example wearable computing device while detecting that a pointing object 226 is passing between the first object 220 and the second object 222. As a result of the passing, the second object 222 is partially occluded, while the first object 220 remains non-occluded. In response to detecting the passing of the pointing object and the occlusion of the second object 222, the wearable computing device may segment the layer 224 into two separate layers along, for example, the edge of the non-occluded first object 220. FIG. 2K is an image of the scene 218 as it may be perceived by the user of the example wearable computing device after further segmenting the video data into a number of layers, in accordance with an embodiment. It will be understood that the passing of the pointing object may be repeated one or more times in order to further segment the video data.

4. Alternative Embodiment

While the foregoing description focused on an example embodiment in which a user may select a layer by moving the pointing object in proximity to the layer, in other embodiments, the user may instead select a layer using an audible input. For example, once the wearable computing device has segmented a scene into layers (e.g., as shown in FIG. 2B), the user may speak aloud an audible input, such as "Search on the cup." The wearable computing device may then initiate a visual search on all of the layers in the scene and provide the user results of the search that are most similar to the audible input. For example, the wearable computing device may select and provide results that include and/or are associated with one or more terms in the audible input, such as results that include the term "cup".

In some embodiments, the user may use a combination of moving the pointing object and speaking audible inputs to select a layer. For example, the user may move the pointing object in proximity to the layer and speak aloud an audible input. The wearable computing device may then initiate a visual search on all of the layers that are, e.g., within a threshold proximity to the pointing device and may provide the user with results of the search that are most similar to the audible input, as described above. As another example, the user may move the pointing object between objects in the scene to aid the wearable computing device in segmenting the scene into the layers, as described above. Then, once the wearable computing device has sufficiently segmented the scene into layers, the user may speak an audible input to select a layer, as described above. Movement of the pointing object and audible commands may be combined in other ways as well, offering a user various options for interacting with the wearable computing device.

5. Example Architecture

Systems and devices in which example embodiments of the above example methods may be implemented will now be described in greater detail. In general, an example system may be implemented in or may take the form of a wearable computing device. However, an example system may also be implemented in or take the form of other devices, such as a mobile phone or tablet computer, among others. Further, an example system may take the form of non-transitory computer-readable medium, which has program instructions stored thereon that are executable by at least one processor to provide the functionality described herein. An example system may also take the form of a device, such as a wearable computing device, mobile phone, or tablet computer, or a subsystem of such a device that includes such a non-transitory computer-readable medium having such program instructions stored thereon.

a. Example System

Figure 3:
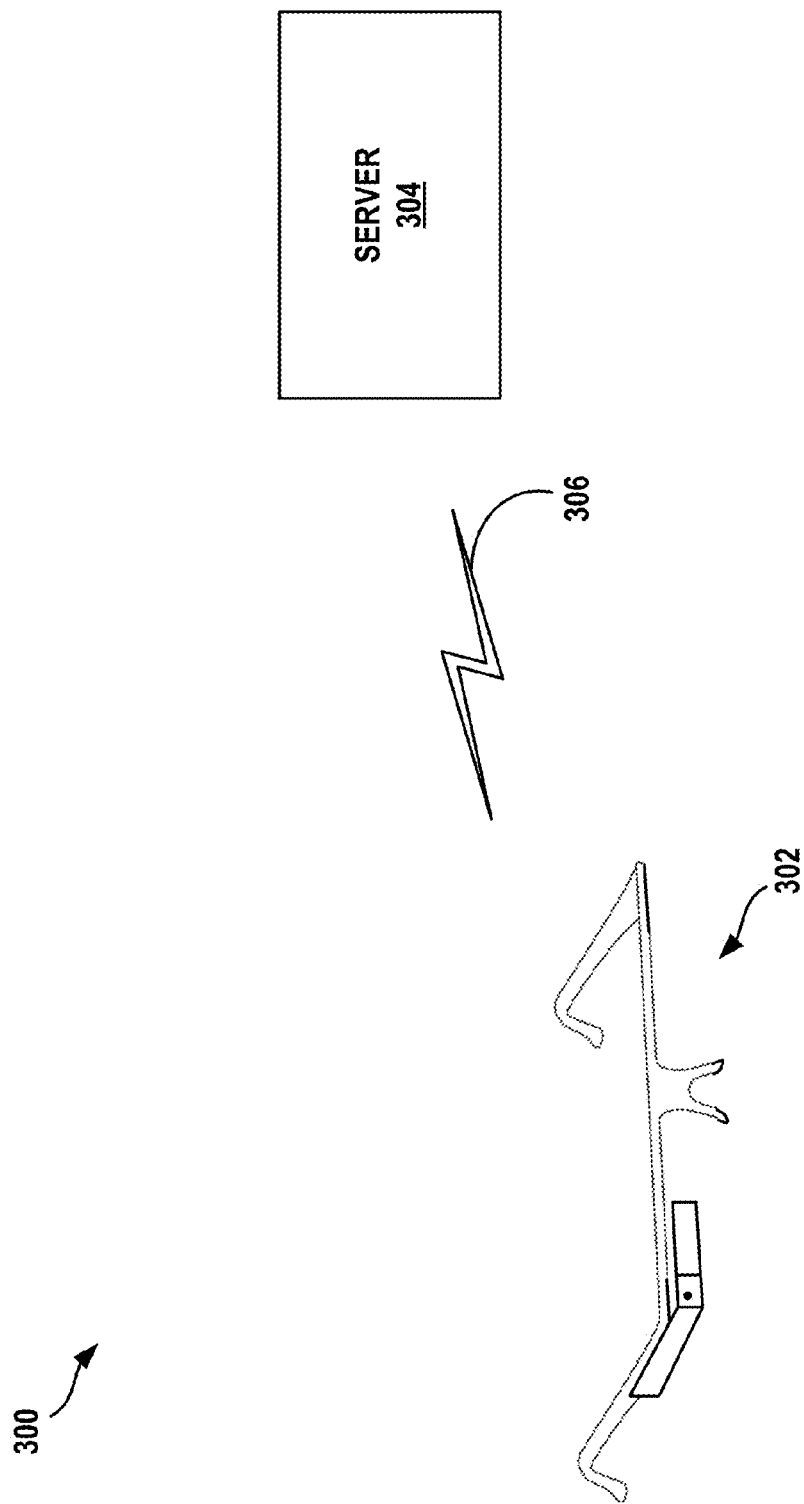
FIG. 3 illustrates an example system in which the disclosed methods may be executed, in accordance with an embodiment.

FIG. 3 illustrates an example system 300 in which the disclosed methods may be executed, in accordance with an embodiment. As shown, the system 300 includes a wearable computing device 302 that is communicably coupled to a server 304 via a wireless link 306. While only one wearable computing device 302 and one server 304 are shown, more or fewer wearable computing devices and/or servers are possible as well.

As shown, the wearable computing device 302 is a pair of glasses. In other embodiments, however, other computing devices could additionally or alternatively be used. For example, the wearable computing device 302 may be an otherwise head-mountable device, such as a visor, headphones, a hat, a headband, an earpiece, or any other type of headwear that is configured to communicably couple to the server 304. Alternatively or additionally, the wearable computing device 302 could be an otherwise-wearable computing device, such as a backpack, fanny pack, belt, or any other piece of body wear that is configured to communicably couple to the server. Still alternatively or additionally, the wearable computing device 302 may be a non-wearable computing device, such as a mobile phone, a tablet computer, camera, or any other device configured to communicably couple to server 304.

The server 304 may be, for example, a computer or plurality of computers on which one or more programs and/or applications are executed in order to provide one or more wireless and/or web-based interfaces that are accessible by the wearable computing device 302 via the wireless link 306.

The wireless link 306 may use, for example, Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Alternatively or additionally, the wireless link 306 may be a wired link, such as a wired serial bus (e.g., a universal serial bus or a parallel bus). In either case, the wireless link 406 may be a proprietary connection.

An example wearable computing device is further described below in connection with FIGS. 4A-D and 5, while an example server is further described below in connection with FIG. 6.

b. Example Wearable Computing Device

Figure 4A:
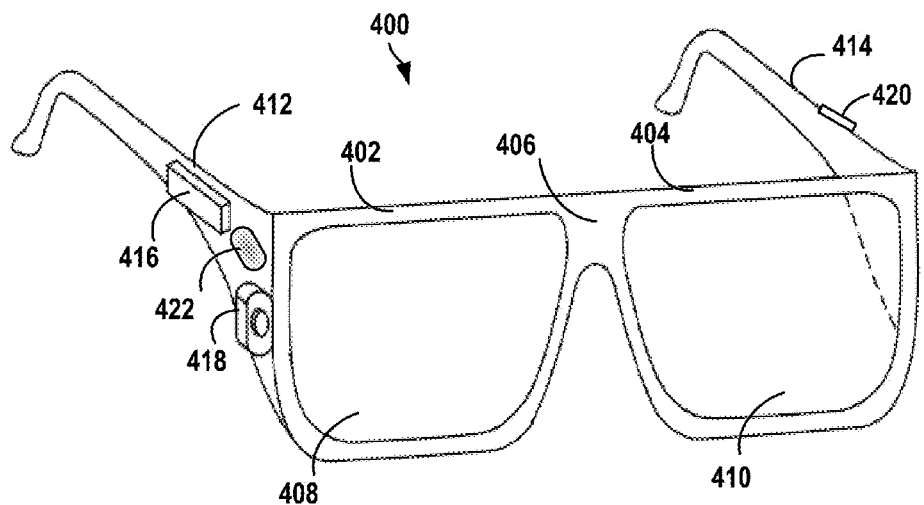
FIGS. 4A-D illustrate three-dimensional renderings of example wearable computing devices, in accordance with an embodiment.

FIGS. 4A-D illustrate three-dimensional renderings of example wearable computing devices, in accordance with an embodiment. As shown in FIG. 4A, the wearable computing system takes the form of a head-mountable device 400 (which may also be referred to as a head-mountable display). The wearable computing device may take other forms as well, including any of those described above.

As illustrated in FIG. 4A, the head-mountable device 400 comprises frame elements including lens-frames 402, 404 and a center frame support 406, lens elements 408, 410, and extending side-arms 412, 414. The center frame support 406 and the extending side-arms 412, 414 are configured to secure the head-mountable device 400 to a user's face via a user's nose and ears, respectively.

Each of the frame elements 402, 404, and 406 and the extending side-arms 412, 414 may be formed of a solid structure of plastic and/or metal, or may be formed of a hollow structure of similar material so as to allow wiring and component interconnects to be internally routed through the head-mountable device 400. Other materials may be possible as well.

One or more of each of the lens elements 408, 410 may be formed of any material that can suitably display a projected image or graphic. Each of the lens elements 408, 410 may also be sufficiently transparent to allow a user to see through the lens element. Combining these two features of the lens elements 408, 410 may facilitate an augmented reality or heads-up display where a projected image or graphic is superimposed over a real-world view as perceived by the user through the lens elements. For example, combining these two features of the lens elements 408, 410 may allow the head-mountable device 400 to overlay textual and/or graphical information on a scene, as described above.

The extending side-arms 412, 414 may each be projections that extend away from the lens-frames 408, 410, respectively, and may be positioned behind a user's ears to secure the head-mountable device 400 to the user. The extending side-arms 412, 414 may further secure the head-mountable device 400 to the user by extending around a rear portion of the user's head (not shown). Additionally or alternatively, for example, the head-mountable device 400 may connect to or be affixed within a head-mountable helmet structure (not shown). Other possibilities exist as well.

The head-mountable device 400 may also include an on-board computing system 416, a video camera 418, a sensor 420, and a finger-operable touch pad 422. The on-board computing system 416 is shown to be positioned on the extending side-arm 412 of the head-mountable device 400; however, the on-board computing system 416 may be provided on other parts of the head-mountable device 400 or may be positioned remote from the head-mountable device 400 (e.g., the on-board computing system 416 could be wire- or wirelessly-connected to the head-mountable device 400). The on-board computing system 416 may include a processor and memory, for example. The on-board computing system 416 may be configured to receive and analyze data from the video camera 418 and the finger-operable touch pad 422 (and possibly from other sensory devices, user interfaces, or both) and generate images for output by the lens elements 408 and 410.

The video camera 418 is shown positioned on the extending side-arm 412 of the head-mountable device 400; however, the video camera 418 may be provided on other parts of the head-mountable device 400. The video camera 418 may be configured to capture images at various resolutions or at different frame rates. A number of types of video cameras with a small form-factor, such as those used in cell phones or webcams, for example, may be incorporated into an example of the head-mountable device 400.

Further, although FIG. 4A illustrates one video camera 418, more video cameras may be used, and each may be configured to capture the same view, or to capture different views. For example, the video camera 418 may be forward facing to capture at least a portion of the real-world view perceived by the user. This forward facing image captured by the video camera 418 may then be used to generate an augmented reality in which computer generated images appear to interact with the real-world view perceived by the user.

The sensor 420 is shown on the extending side-arm 414 of the head-mountable device 400; however, the sensor 420 may be positioned on other parts of the head-mountable device 400. The sensor 420 may include one or more of a gyroscope or an accelerometer, for example. Other sensing devices may be included within, or in addition to, the sensor 420 or other sensing functions may be performed by the sensor 420.

The finger-operable touch pad 422 is shown on the extending side-arm 412 of the head-mountable device 400. However, the finger-operable touch pad 422 may be positioned on other parts of the head-mountable device 400. Also, more than one finger-operable touch pad may be present on the head-mountable device 400. The finger-operable touch pad 422 may be used by a user to input commands. The finger-operable touch pad 422 may sense at least one of a position and a movement of a finger via capacitive sensing, resistance sensing, or a surface acoustic wave process, among other possibilities. The finger-operable touch pad 422 may be capable of sensing finger movement in a direction parallel and/or planar to the pad surface, in a direction normal to the pad surface, or both, and may also be capable of sensing a level of pressure applied to the pad surface. The finger-operable touch pad 422 may be formed of one or more translucent or transparent insulating layers and one or more translucent or transparent conducting layers. Edges of the finger-operable touch pad 422 may be formed to have a raised, indented, or roughened surface, so as to provide tactile feedback to a user when the user's finger reaches the edge, or other area, of the finger-operable touch pad 422. If more than one finger-operable touch pad is present, each finger-operable touch pad may be operated independently, and may provide a different function.

Figure 4B:
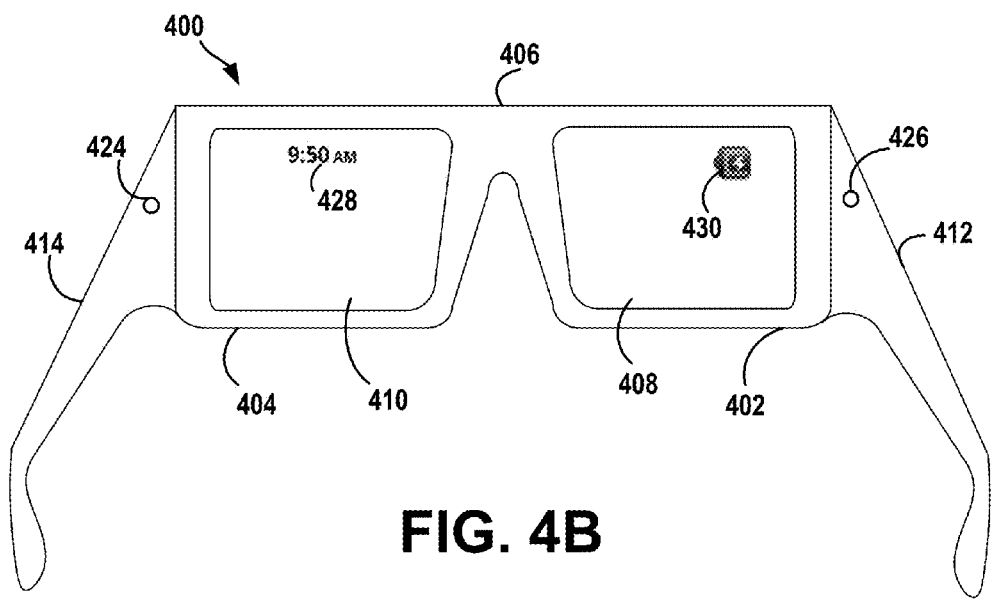

FIG. 4B illustrates an alternate view of the three-dimensional rendering of the example wearable computing device illustrated in FIG. 4A, in accordance with an embodiment. As shown in FIG. 4B, the lens elements 408, 410 may act as display elements. The head-mountable device 400 may include a first projector 424 coupled to an inside surface of the extending side-arm 414 and configured to project a display 428 onto an inside surface of the lens element 410. Additionally or alternatively, a second projector 426 may be coupled to an inside surface of the extending side-arm 412 and configured to project a display 430 onto an inside surface of the lens element 408.

The lens elements 408, 410 may act as a combiner in a light projection system and may include a coating that reflects the light projected onto them from the projectors 424, 426. In some embodiments, a reflective coating may not be used (e.g., when the projectors 424, 426 are scanning laser devices).

In alternative embodiments, other types of display elements may also be used. For example, the lens elements 408, 410 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 408, 410 for driving such a matrix display. Alternatively or additionally, a laser or LED source and scanning system could be used to draw a raster display directly onto the retina of one or more of the user's eyes. Other possibilities exist as well.

Figure 4C:
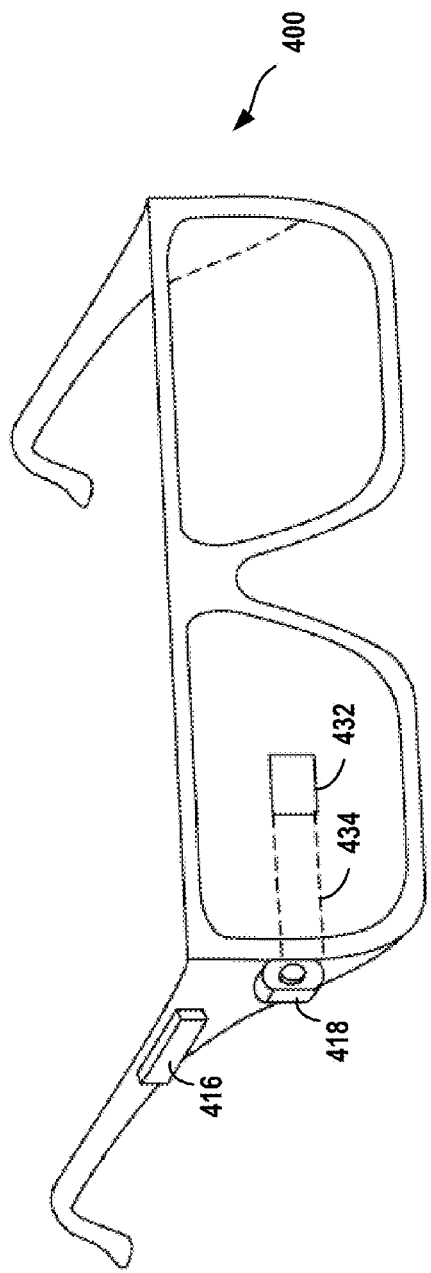

FIG. 4C illustrates a three-dimensional rendering of another wearable computing system, in accordance with an embodiment. As shown in FIG. 4C, the wearable computing device takes the form of a head-mountable device 400. The head-mountable device 400 may include frame elements and side-arms similar to those described above in connection with FIGS. 4A-B. The head-mountable device 400 may additionally include an on-board computing system 416 and a video camera 418, which may take any of the forms described above in connection with FIGS. 4A-B. The video camera 418 is shown mounted on a frame of the head-mountable device 400. However, the video camera 418 may be mounted at other positions as well.

As shown in FIG. 4C, the head-mountable device 400 may include a single display 432 which may be coupled to the head-mountable device 400. The display 432 may be formed on one of the lens elements of the head-mountable device 400 and may be configured to overlay computer-generated graphics in the user's view of the physical world. For example, the display 432 may be configured to overlay information corresponding to results of searches on layers, as described above. The display 432 is shown to be provided in a center of a lens of the head-mountable device 400; however, the display 432 may be provided in other positions as well. The display 432 is controllable via the computing system 416, which may be coupled to the display 432 via an optical waveguide 434, as shown.

Figure 4D:
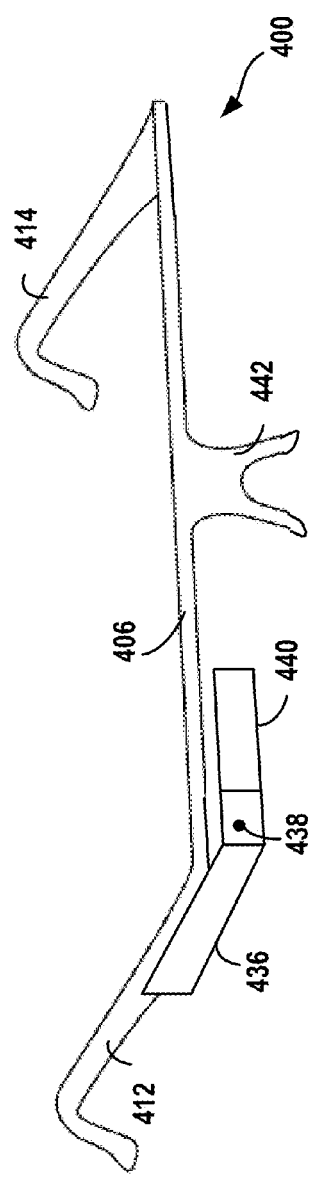

FIG. 4D illustrates a three-dimensional rendering of another wearable computing system, in accordance with an embodiment. As shown in FIG. 4D, the wearable computing device takes the form of a head-mountable device 400. The head-mountable device 400 may include side-arms 412, 414 and a center frame support 406, which take any of the forms described above in connection with FIGS. 4A-B. Further, the head-mountable device 400 may include a bridge portion with nosepiece 442. The head-mountable device 400 may additionally include an on-board computing system and a video camera (not shown), which may take any of the forms described above in connection with FIGS. 4A-B.

As shown in FIG. 4D, the center frame support 406 connects the side-arms 412, 414. In contrast to those shown in FIGS. 4A-C, the head-mountable device 400 shown in FIG. 4D does not include lens-frames containing lens elements. Rather, as shown, the head-mountable device 400 may include a single lens element 440 that may be coupled to one of the side-arms 412 and/or the center frame support 406. The single lens element 440 may include a display and may be configured to overlay computer-generated graphics upon the user's view of the physical world. For example, the display 432 may be configured to overlay information corresponding to results of searches on layers, as described above. The display may be controllable via the computing system, which may be coupled to the display via an optical waveguide 438, as shown.

In one example, the single lens element 440 may be coupled to the inner side (i.e., the side exposed to a portion of a user's head when worn by the user) of the extending side-arm 412. The single lens element 440 may be positioned in front of or proximate to a user's eye when the head-mountable device 400 is worn by a user. For example, the single lens element 440 may be positioned below the center frame support 406, as shown in FIG. 4D.

Figure 5:
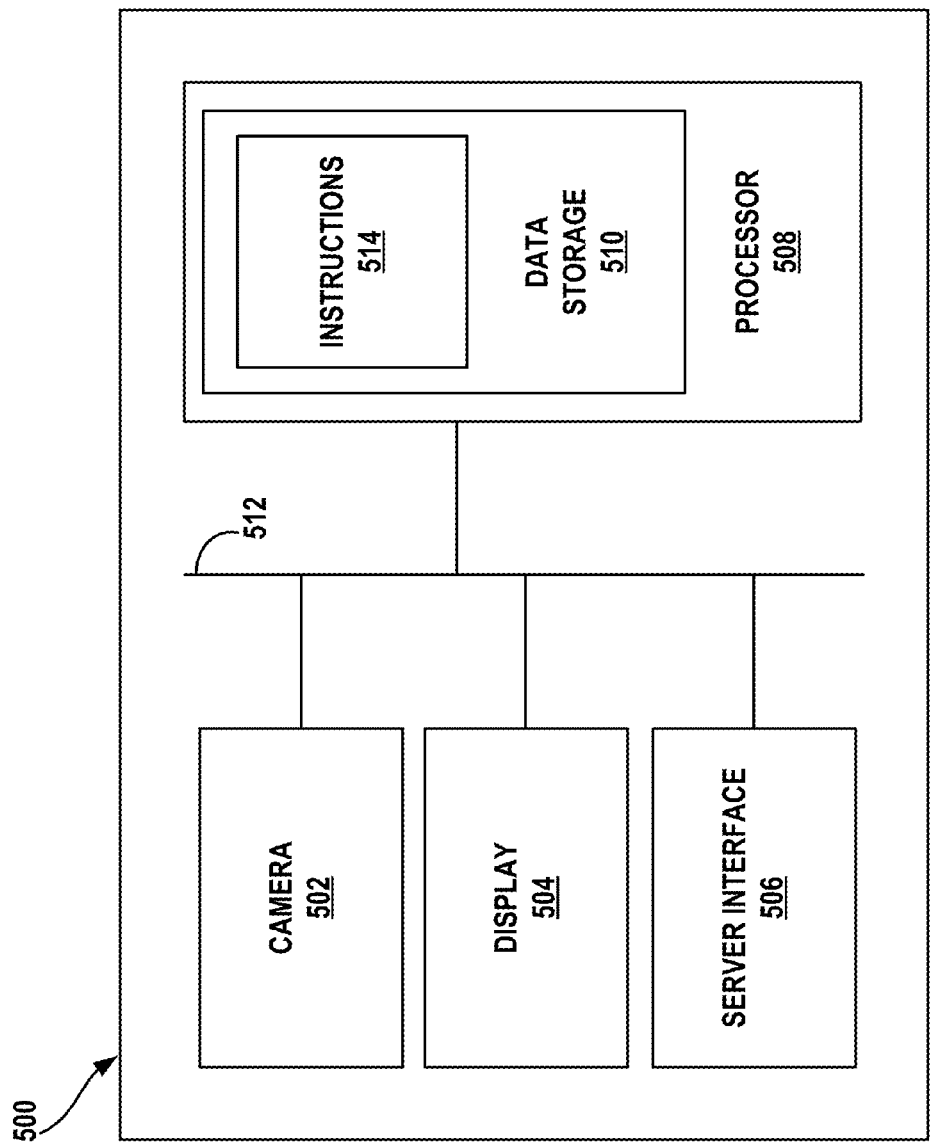
FIG. 5 is a simplified block diagram of an example wearable computing device, in accordance with an embodiment.

FIG. 5 is a simplified block diagram of an example wearable computing device 500, in accordance with an embodiment. As shown, the wearable computing device 500 includes an image-capture device 502, a display 504, a server interface 506, a processor 508, and data storage 510, all of which may be communicatively linked together by a system bus, network, and/or other connection mechanism 512.

The image-capture device 502 may be any device configured to capture video data. To this end, the image-capture device 502 may be, for example, a camera, such as a camera that is configured to detect visible light, or light from other portions of the spectrum, such as infrared or ultraviolet light, or x-rays. Other types of cameras are possible as well. The image-capture device 502 may be a two-dimensional detector, or may have a three-dimensional spatial range. In some embodiments, the image-capture device 502 may be, for example, a range detector configured to generate a two-dimensional image showing a distance from the image-capture device 502 to a number of points in the video data. To this end, the image-capture device 502 may use one or more range detecting techniques. For example, the image-capture device 502 may use a structured light technique in which the wearable computing device 500 illuminates an object with a predetermined light pattern, such as a grid or checkerboard pattern and uses the image-capture device 502 to detect a reflection of the predetermined light pattern off the object. Based on distortions in the reflected light pattern, the wearable computing device 500 may determine the distance to the points on the object. The predetermined light pattern may comprise infrared light, or light of another wavelength. As another example, the image-capture device 502 may use a laser scanning technique in which the wearable computing device 500 emits a laser and scans across a number of points the object. While scanning the object, the wearable computing device 500 uses the image-capture device 502 to detect a reflection of the laser off the object for each point. Based on a length of time it takes the laser to reflect off the object at each point, the wearable computing device 500 may determine the distance to the points on the object. As yet another example, the image-capture device 502 may use a time-of-flight technique in which the wearable computing device 500 emits a light pulse and uses the image-capture device 502 to detect a reflection of the light pulse off an object at a number of points on the object. In particular, the image-capture device 502 may include a number of pixels, and each pixel may detect the reflection of the light pulse from a point on the object. Based on a length of time it takes the light pulse to reflect off the object at each point, the wearable computing device 500 may determine the distance to the points on the object. The light pulse may be a laser pulse. Other range detecting techniques are possible as well, including stereo triangulation, sheet-of-light triangulation, interferometry, and coded aperture techniques, among others. In some embodiments, the image-capture device 502 may be enhanced through sensor fusion technology. The image-capture device 502 may further take any of the forms described above in connection with the video camera 418 of FIG. 4A. The display 504 may be any display configured to display information corresponding to results of a search, as described above. In some embodiments, the display may additionally be configured to display the video data recorded by the image-capture device 502. To this end, the display 504 may be configured to display information received from the processor 508. The display 504 may additionally be configured to display information received from one or more additional sources. The display 504 may be, for example, a heads-up display, a head-mountable display, an optical see-through display, an optical see-around display, a video see-through display, a flat-panel display, a light-emitting diode (LED) display, an electroluminescent display (ELD), a liquid crystal display (LCD), an organic LED (OLED) display, or any other type of display now known or later developed. The display 504 may alternatively or additionally take any of the forms described above in connection with FIGS. 4A-D.

The server interface 506 may be any interface configured to wirelessly communicate with a server. In particular, the server interface 506 may be configured to transmit to the server one or more of the video data (or data derived from the video data) recorded by the image-capture device 502 and a request to initiate a search. Further, the server interface 506 may be configured to receive from the server the video data segmented into layers and/or information corresponding to results of the search.

To this end, the server interface 506 may include an antenna and a chipset for communicating with the server over an air interface. The chipset or server interface 506 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the server interface 506 may also be configured to wirelessly communicate with one or more other devices, such as a database and/or other wearable computing devices.

The processor 508 may comprise one or more general-purpose processors and/or one or more special-purpose processors. To the extent the processor 508 includes more than one processor, such processors could work separately or in combination. Further, the processor 508 may be integrated in whole or in part with the server interface 504 and/or with other components.

Data storage 510, in turn, may comprise one or more volatile and/or one or more non-volatile storage components, such as optical, magnetic, and/or organic storage, and data storage 510 may be integrated in whole or in part with the processor 508. In some embodiments, data storage 510 may contain instructions 514 (e.g., program logic) executable by the processor 508 to execute various wearable computing device functions. For example, data storage 510 may contain instructions 514 executable by the processor 508 to cause the image-capture device 502 to record the video data. The instructions 514 may be further executable by the processor 508 to segment the video data into layers. This segmenting may involve the wearable computing device 500 segmenting the video data itself, or may involve the wearable computing device 500 causing the server interface 506 to transmit the video data (or data derived from the video data) to the server and, in response, receiving from the server the video data segmented into layers. The instructions 514 may be still further executable by the processor 508 to detect, based on the video data, that a pointing object is in proximity to a first layer. The instructions may be still further executable by the processor 508 to initiate a first search on the layer. This initiation may involve the wearable computing device 500 searching a database itself, or may involve the wearable computing device 500 causing the server interface 506 to transmit to the server a request for the server to search the database. The request may include the video data (or data derived from the video data) recorded by the image-capture device 502 in segmented or unsegmented form. Data storage 510 may contain additional instructions 514 as well.

The wearable computing device 500 may include one or more elements in addition to or instead of those shown. For example, the wearable computing device 500 may include a movement sensor, which may be any sensor configured to sense movement of the wearable computing device, such as a gyroscope or an accelerometer, for example. Other movement sensors are possible as well. As another example, the wearable computing device 500 may include one or more additional interfaces and/or one or more power supplies. Other additional components are possible as well. In these embodiments, data storage 510 may further include instructions executable by the processor(s) to control and/or communicate with the additional components.

c. Example Server

FIG. 6 shows a block diagram of an example server 600, in accordance with an embodiment. As shown, the server 600 includes a device interface 602, a processor 604, and data storage 606, all of which may be communicatively linked together by a system bus, network, and/or other connection mechanism 608.

The device interface 602 may be any interface configured to wirelessly communicate with a wearable computing device. In particular, the device interface 602 may be configured to receive from the wearable computing device one or both of video data (or data derived from video data) captured by an image-capture device at the wearable computing device and a request to initiate search. Further, the device interface 602 may be configured to transmit to the wearable computing device information corresponding to results of the search and, in some embodiments, the video data segmented into layers.

To this end, the device interface 602 may include an antenna and a chipset for communicating with the wearable computing device over an air interface. The chipset or device interface 602 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the device interface 602 may also be configured to wirelessly communicate with one or more other devices, such as a database and/or other wearable computing devices.

The processor 604 may comprise one or more general-purpose processors and/or one or more special-purpose processors. To the extent the processor 604 includes more than one processor, such processors could work separately or in combination. Further, the processor 604 may be integrated in whole or in part with the device interface 602 and/or with other components.

Data storage 606, in turn, may comprise one or more volatile and/or one or more non-volatile storage components, such as optical, magnetic, and/or organic storage, and data storage 606 may be integrated in whole or in part with the processor 604. As shown, data storage 606 may contain instructions 612 (e.g., program logic) executable by the processor 604 to execute various server functions. For example, data storage 606 may include instructions 612 executable by the processor 604 to segment the video data received from the wearable computing device via the device interface 602 into layers. The instructions 610 may be further executable by the processor 604 to detect, based on the video data, detect that a pointing object is in proximity to a first layer. The instructions 610 may be further executable by the processor 604 to initiate a search on the first layer. Data storage 606 may include additional program logic as well.

The server 600 may include one or more elements in addition to or instead of those shown. For example, the server 600 may include one or more additional interfaces and/or one or more power supplies. As another example, the server 600 may include database in which the search takes place. The database may take any of the forms described above. Other additional components are possible as well. In these embodiments, data storage 606 may further include instructions executable by the processor(s) to control and/or communicate with the additional components.

6. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   causing a camera on a wearable computing device to record video data;
   segmenting the video data into a number of layers;
   based on the video data, detecting that a pointing object is in proximity to a first layer;
   initiating a first search on the first layer;
   highlighting the first layer;
   based on the video data, detecting that the pointing object is no longer in proximity to the first layer and is in proximity to a second layer; and
   highlighting the second layer.

2. The method of claim 1, further comprising causing a display to display first information corresponding to results of the first search.

3. The method of claim 2, further comprising:
   based on the video data, detecting that the pointing object is no longer in proximity to the first layer and is in proximity to a second layer;
   initiating a second search on the second layer; and
   replacing the first information with second information corresponding to results of the second search.

4. The method of claim 1, wherein the layers exhibit at least one of motion coherence and appearance coherence.

5. The method of claim 1, further comprising receiving an acceptance of the first layer.

6. The method of claim 5, wherein receiving the acceptance comprises receiving at least one of a tactile input, an audible input, and a visual input.

7. The method of claim 1, wherein the pointing device comprises a finger.

8. The method of claim 1, wherein:
   the camera is configured to be offset from an eye of a user by an angle and a distance; and
   detecting that the pointing object is in proximity to the first layer is based on the angle and the distance.

9. The method of claim 1, wherein segmenting the video data into the number of layers comprises:
   segmenting the video data into a first set of layers in which the first layer of the first set of layers comprises both a first object and a second object;
   based on the video data, detecting that the pointing object is behind the first object and in front of the second object; and
   segmenting the video data into a second set of layers in which the first layer of the second set of layers comprises only one of the first object and the second object, wherein the number of layers comprise the second set of layers.

10. A wearable computing device comprising:
    a camera configured to record video data;
    a display;
    at least one processor; and
    data storage comprising instructions executable by the at least one processor to:
      segment the video data into a number of layers;
      based on the video data, detect that a pointing object is in proximity to a first layer;
      initiate a first search on the first layer;
      use the display to highlight the first layer;
      based on the video data, detect that the pointing object is no longer in proximity to the first layer and is in proximity to a second layer; and
      use the display to highlight the second layer.

11. The wearable computing device of claim 10, wherein the display is further configured to display an indication of the layers.

12. The wearable computing device of claim 10, wherein the display is further configured to display the video data.

13. The wearable computing device of claim 10, wherein the display is further configured to display first information corresponding to results of the first search.

14. The wearable computing device of claim 10, further comprising a user interface configured to receive an acceptance of the first layer.

15. The wearable computing device of claim 14, wherein the user interface comprises at least one of a touchpad and a microphone.

16. A non-transitory computer-readable medium having stored therein instructions executable by a computing device to cause the computing device to perform functions comprising:
   causing a camera on a wearable computing device to record video data;
   segmenting the video data into a number of layers;
   based on the video data, detecting that a pointing object is in proximity to a first layer;
   initiating a first search on the first layer;
   highlighting the first layer;
   based on the video data, detecting that the pointing object is no longer in proximity to the first layer and is in proximity to a second layer; and
   highlighting the second layer.

17. The non-transitory computer-readable medium of claim 16, wherein the functions further comprise displaying first information corresponding to results of the first search.

18. A method comprising:
   causing a camera on a wearable computing device to record video data;
   segmenting the video data into a first set of layers in which a first layer of the first set of layers comprises both a first object and a second object;
   based on the video data, detecting that a pointing object is behind the first object and in front of the second object;
   segmenting the video data into a second set of layers in which a first layer of the second set of layers comprises only one of the first object and the second object;
   receiving an audible input;
   initiating a visual search on one or more of the second set of layers;
   based on the audible input, selecting information corresponding to at least some results of at least some of the visual searches; and
   displaying the selected information.

19. The method of claim 18, further comprising:
   based on the video data, detecting that a pointing object is in proximity to the first layer of the second set of layers, and
   wherein selecting information corresponding to at least some results of at least some of the visual searches comprises selecting the information based at least in part on a result of a visual search of the first layer of the second set of layers.

20. A method comprising:
   causing a camera on a wearable computing device to record video data;
   segmenting the video data into a number of layers;
   based on the video data, detecting that a pointing object is in proximity to a first layer;
   initiating a first search on the first layer;
   causing a display to display first information corresponding to results of the first search;
   based on the video data, detecting that the pointing object is no longer in proximity to the first layer and is in proximity to a second layer;
   initiating a second search on the second layer; and
   replacing the first information with second information corresponding to results of the second search.

21. The method of claim 20, wherein:
   the camera is configured to be offset from an eye of a user by an angle and a distance; and
   detecting that the pointing object is in proximity to the first layer is based on the angle and the distance.

22. A method comprising:
   causing a camera on a wearable computing device to record video data;
   segmenting the video data into a first set of layers in which a first layer of the first set of layers comprises both a first object and a second object;
   based on the video data, detecting that a pointing object is behind the first object and in front of the second object;
   segmenting the video data into a second set of layers in which a first layer of the second set of layers comprises only one of the first object and the second object;
   based on the video data, detecting that a pointing object is in proximity to the first layer of the second set of layers; and
   initiating a first search on the first layer of the second set of layers.

23. The method of claim 22, wherein:
   the camera is configured to be offset from an eye of a user by an angle and a distance; and
   detecting that the pointing object is in proximity to the first layer is based on the angle and the distance.

* * * * *